US011779784B2

(12) United States Patent
Shrank et al.

(10) Patent No.: US 11,779,784 B2
(45) Date of Patent: Oct. 10, 2023

(54) FALL-PROTECTION APPARATUS WITH BRAKING DEVICE COMPRISING FLEXURE-BORNE PAWL AND DRUM-MOUNTED BUTTRESS

(71) Applicant: 3M INNOVATIVE PROPERTIES COMPANY, St. Paul, MN (US)

(72) Inventors: Greg E. Shrank, Red Wing, MN (US); Daniel C. Lewis, Christchurch (NZ)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/013,212

(22) PCT Filed: Jul. 9, 2021

(86) PCT No.: PCT/IB2021/056197
§ 371 (c)(1),
(2) Date: Dec. 27, 2022

(87) PCT Pub. No.: WO2022/009175
PCT Pub. Date: Jan. 13, 2022

(65) Prior Publication Data
US 2023/0228305 A1    Jul. 20, 2023

Related U.S. Application Data

(60) Provisional application No. 63/195,414, filed on Jun. 1, 2021, provisional application No. 63/195,389, filed
(Continued)

(51) Int. Cl.
*A62B 35/00* (2006.01)
*F16D 59/00* (2006.01)
(Continued)

(52) U.S. Cl.
CPC .......... *A62B 35/0093* (2013.01); *F16D 59/00* (2013.01); *F16D 63/006* (2013.01);
(Continued)

(58) Field of Classification Search
CPC ....... A62B 35/0093; A62B 35/04; F16D 9/00; F16D 63/006; F16D 2121/14; F16D 2127/002
See application file for complete search history.

(56) References Cited

U.S. PATENT DOCUMENTS 3,589,486 A * 6/1971 Kelch .................... F16H 31/001
192/48.92
3,928,862 A * 12/1975 Ivester .................... F16D 41/18
396/40
(Continued)

FOREIGN PATENT DOCUMENTS

WO    2019012454 A1    1/2019
WO    2022003501 A1    1/2022

OTHER PUBLICATIONS

3M DBI SALA Fall Protection Full Line Catalog 2016, pp. 1-128.
International Search Report for PCT Application No. PCT/IB2021/056197, dated Sep. 24, 2021, 3 pages.

*Primary Examiner* — Colleen M Chavchavadze
(74) *Attorney, Agent, or Firm* — Kenneth B. Wood

(57) ABSTRACT

A fall-protection apparatus comprising a rotationally-activated braking device that comprises at least one flexure-borne pawl and at least one buttress that is on a sidewall of a rotatable drum of the braking device.

20 Claims, 13 Drawing Sheets

Related U.S. Application Data on Jun. 1, 2021, provisional application No. 63/050,201, filed on Jul. 10, 2020.

(51) Int. Cl.
 *F16D 63/00* (2006.01)
 *A62B 35/04* (2006.01)
 *F16D 121/14* (2012.01)
 *F16D 127/00* (2012.01)
 *F16D 127/02* (2012.01)

(52) U.S. Cl.
 CPC .......... *A62B 35/04* (2013.01); *F16D 2121/14* (2013.01); *F16D 2127/002* (2013.01); *F16D 2127/02* (2013.01)

(56) References Cited

U.S. PATENT DOCUMENTS

| | | | | |
|---|---|---|---|---|
| 4,480,736 A | * | 11/1984 | Loizeau | F16F 15/1212 464/57 |
| 4,718,617 A | * | 1/1988 | Vadasz | A01K 89/02 242/243 |
| 5,186,289 A | * | 2/1993 | Wolner | F16D 59/00 188/65.1 |
| 5,351,906 A | * | 10/1994 | Feathers | A62B 1/10 242/396.6 |
| 5,355,979 A | * | 10/1994 | Stephan | F16D 41/069 188/290 |
| 5,447,280 A | | 9/1995 | Feathers | |
| 5,522,489 A | * | 6/1996 | Savkar | F16D 41/064 192/41 R |
| 5,697,476 A | * | 12/1997 | Susmark | E05D 13/003 188/189 |
| 5,722,612 A | * | 3/1998 | Feathers | A62B 35/0093 242/381.5 |
| 6,148,979 A | * | 11/2000 | Roach | F16D 43/16 74/577 M |
| 6,757,975 B1 | * | 7/2004 | Todd | F16D 43/18 192/105 CD |
| 7,281,620 B2 | * | 10/2007 | Wolner | F16D 63/006 192/223.1 |
| 8,181,744 B2 | | 5/2012 | Parker et al. | |
| 8,256,574 B2 | | 9/2012 | Griffiths et al. | |
| 8,430,206 B2 | | 4/2013 | Griffiths et al. | |
| 8,430,207 B2 | | 4/2013 | Griffiths et al. | |
| 8,439,291 B2 | * | 5/2013 | Ukita | B60R 22/3413 242/375 |
| 8,511,434 B2 | | 8/2013 | Blomberg | |
| 9,488,235 B2 | * | 11/2016 | Casebolt | F16D 59/00 |
| 11,504,557 B2 | | 11/2022 | Boraas et al. | |
| 2013/0277631 A1 | * | 10/2013 | Luntz | B66D 3/046 254/391 |
| 2016/0096048 A1 | * | 4/2016 | Fegley | A62B 1/10 182/232 |

* cited by examiner

FALL-PROTECTION APPARATUS WITH BRAKING DEVICE COMPRISING FLEXURE-BORNE PAWL AND DRUM-MOUNTED BUTTRESS

CROSS REFERENCE TO RELATED APPLICATIONS

This application is a national stage filing under 35 U.S.C. 371 of PCT/IB2021/056197, filed 9 Jul. 2021, which claims the benefit of U.S. Provisional Patent Application No. 63/050,201, filed 10 Jul. 2020, and claims the benefit of U.S. Provisional Patent Application No. 63/195,389, filed 1 Jun. 2021, and claims the benefit of U.S. Provisional Patent Application No. 63/195,414 filed 1 Jun. 2021, the disclosure of which is incorporated by reference in its/their entirety herein.

BACKGROUND

Fall-protection apparatus such as self-retracting lifelines have often found use in applications such as building construction and the like.

SUMMARY

In broad summary, herein is disclosed a fall-protection apparatus comprising a rotationally-activated braking device that comprises at least one pawl that is a flexure-borne pawl, and that further comprises at least one buttress that is affixed to a sidewall of rotatable drum of the braking device. In various aspects, such a flexure-borne pawl may be a velocity-actuated pawl and/or it may be an acceleration-actuated pawl. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "first" and "second" may be used in this disclosure, it should be understood that those terms are used in their relative sense only unless otherwise noted.

Figure 2:
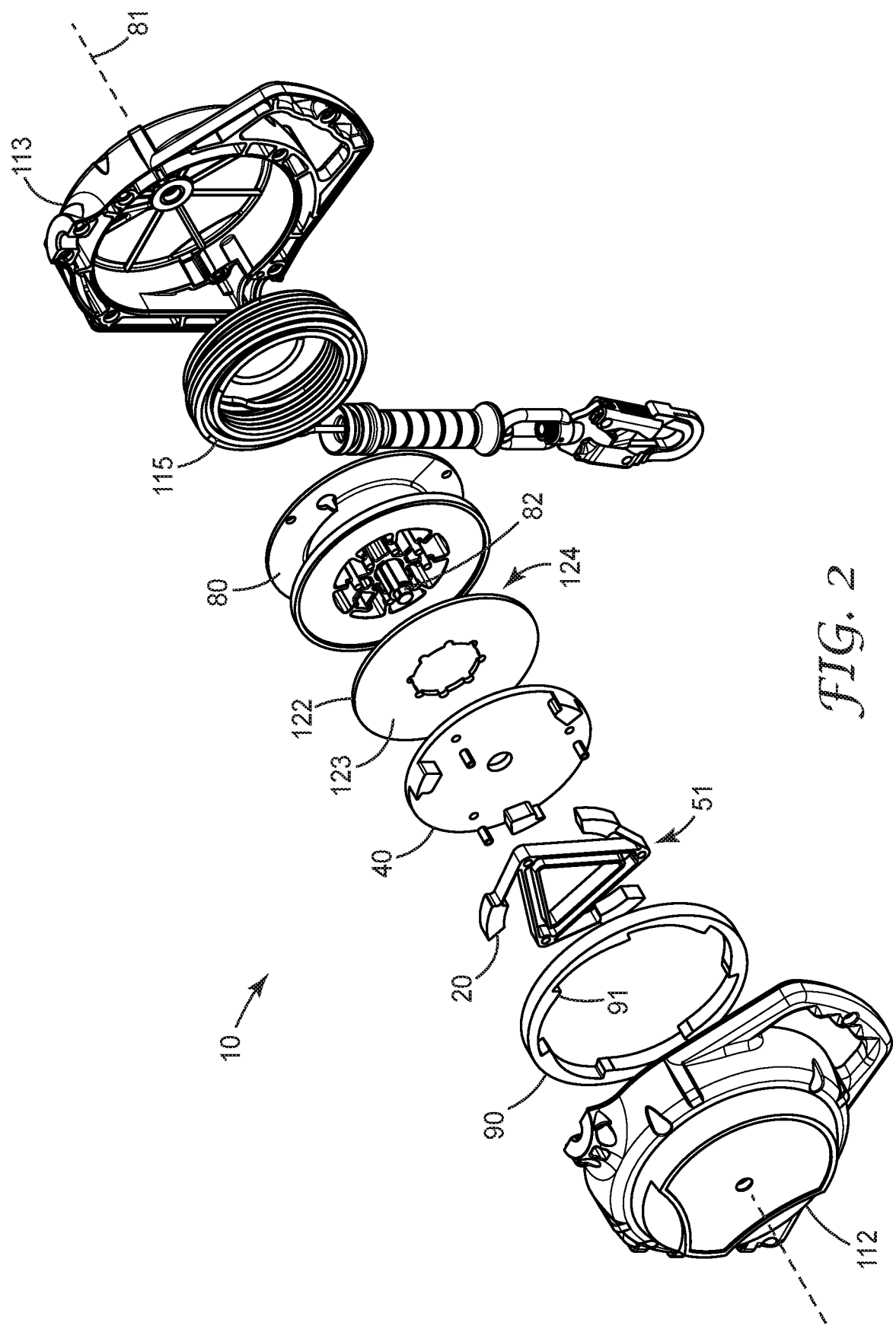
FIG. 2 is a perspective partially-exploded view of various components of an exemplary fall-protection apparatus.
Figure 8:
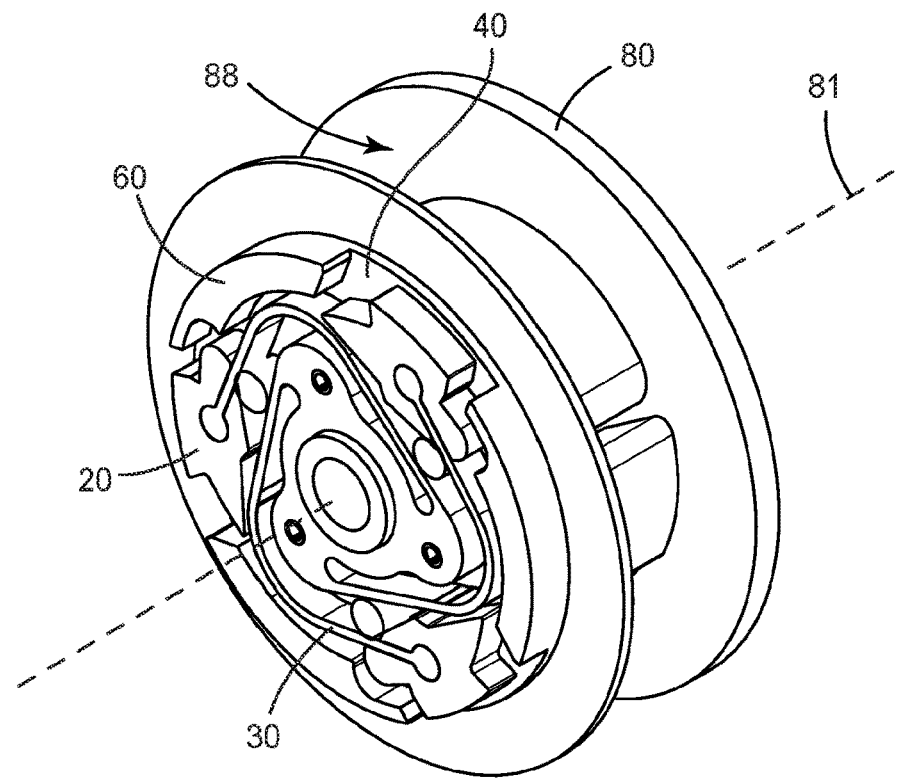
FIG. 8 is an isolated perspective view of various components of another exemplary fall-protection apparatus.

Geometric descriptors are used herein, unless otherwise specified, with reference to a drum 80 and an associated pawl-support plate 40 of a fall-protection apparatus as described in detail herein and as shown in FIG. 2. The term "axially" refers to a direction at least generally parallel to the axis of rotation of the drum, plate, and associated components (e.g. axis of rotation 81 as shown in FIGS. 2 and 8). The term "radial" and like terms refers to a direction generally parallel to the radius and diameter of the drum and plate and generally perpendicular to the axial direction. The terms circumferential, circumferentially, and like terms, refer to an arcuate direction that exhibits a generally constant radius relative to the axis of rotation of the drum and associated components (for example, orbital pathway 25 as indicated on FIG. 4, follows a circumferential path).

Figure 4:
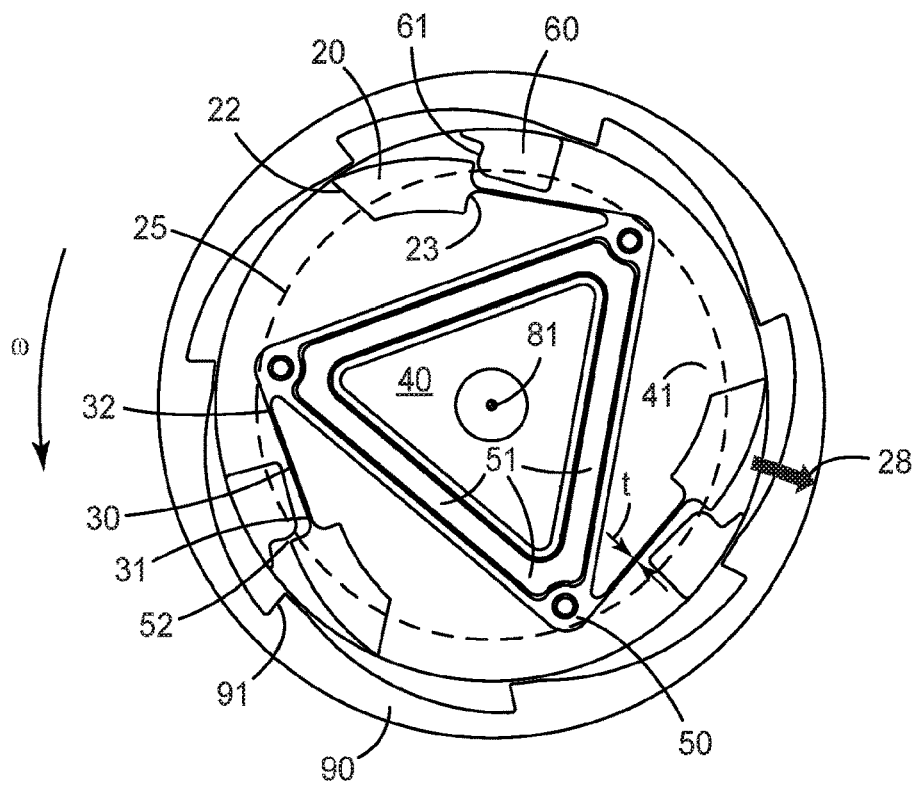
FIG. 4 is a plan view of an exemplary arrangement of flexure-borne pawls.

The direction of rotation of various components (e.g. drum 80, pawl-support plate 40, and other items) in the instance that drum 80 turns rapidly in the event of a user fall, is denoted in various Figures herein by an arcuate arrow labeled ω. (Discussions herein will make it clear that these items can sometimes rotate in the opposite direction; however, the particular direction of fall-induced rotation will be used in order to standardize terms used herein). Terms such as "leading" and "trailing" are used to characterize the relative position of various items that can travel along a generally circumferential pathway in the event of the above-described rotation. "Leading" refers to a component that, upon such rotation, passes a fixed point before a "trailing" component passes the fixed point. In other words, end 22 of pawl 20 as shown in FIG. 4, is a leading end; end 23 is a trailing end of pawl 20. (In some instances, a "leading" direction and a "trailing" direction may be respectively referred to herein as a circumferentially-forward direction and a circumferentially-rearward direction.) The meanings of all of these terms, and related terms and phrases, will be readily apparent based on the descriptions and Figures presented herein.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein is a fall-protection apparatus, by which is meant an apparatus that acts to controllably decelerate a human user of the apparatus in the event of a user fall. By definition, such a fall-protection apparatus is a non-motorized apparatus. By this is meant that a safety line of the apparatus is not moved (i.e., extended or retracted from a housing of the apparatus) by way of an electrically powered motor; in other words, the apparatus is not used as part of a system (e.g., an elevator, a hoist, etc.) that uses one or more motors to raise or lower a load.

In many embodiments, such a fall-protection apparatus may be a self-retracting lifeline (SRL); i.e., a deceleration apparatus comprising a housing at least partially contains a drum-wound safety line that can be extended from the housing and retracted into the housing under slight tension during normal movement of a human user of the apparatus, and which, upon the onset of a user fall, automatically arrests (i.e., slows to a controlled rate, or completely stops) the fall of the user. Such an apparatus may comprise a safety line (made e.g. of metal or any other suitable material) that can be extended out of a lower end of the apparatus with the apparatus having an upper, anchorage end which may be connected e.g. to a secure anchorage of a workplace. Often, such an apparatus may comprise a drum that is rotatably mounted within a housing therein such that such that the safety line can be wound about the drum when the line is retracted into the housing. Such an apparatus will further comprise a rotationally-activated braking device. By this is meant a device that is configured to slow (e.g. stop) the rotation of the drum upon rotation of the drum with a velocity and/or acceleration or combination thereof, that is above a predetermined threshold value.

Figure 1:
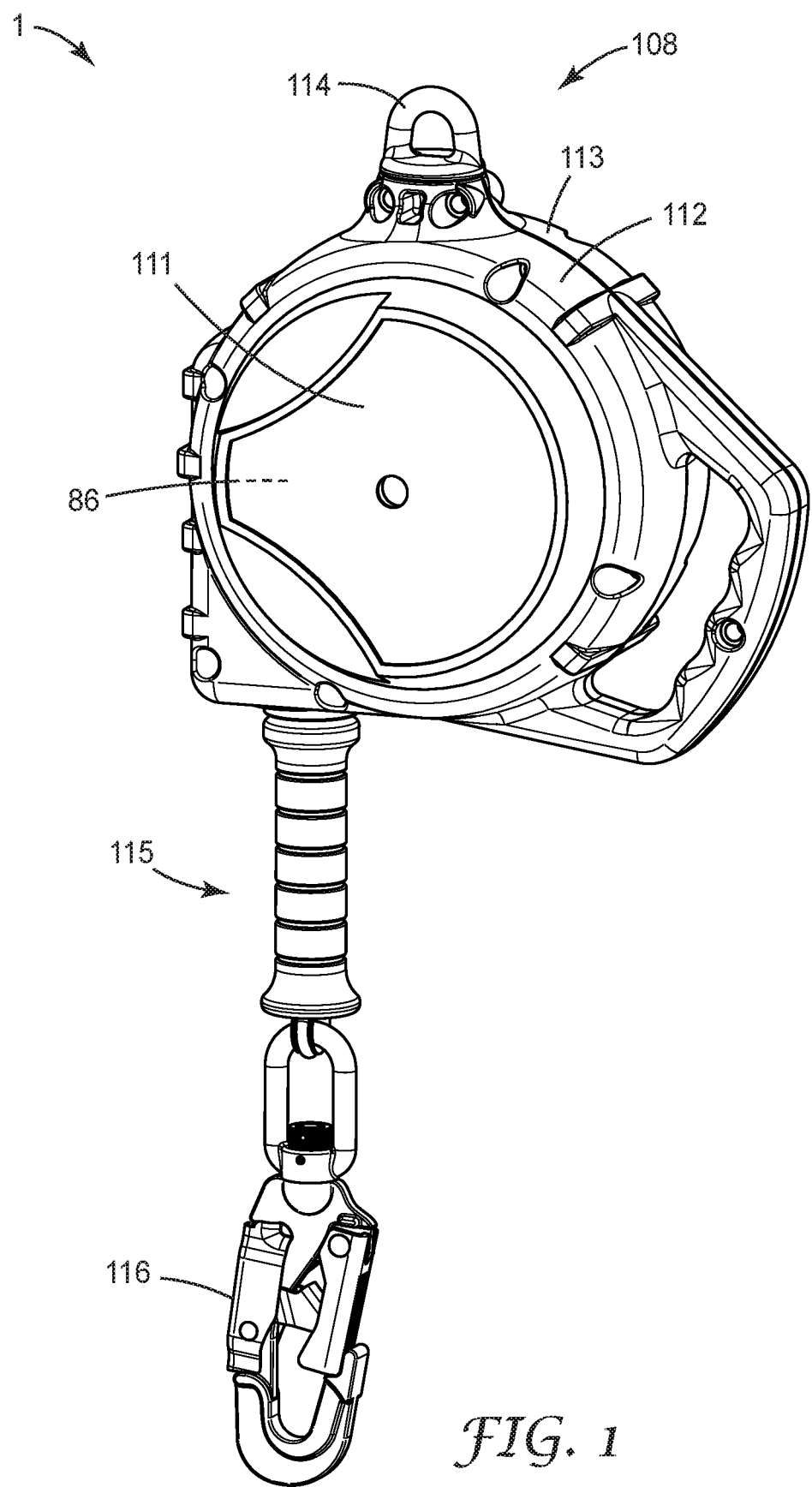
FIG. 1 is a perspective view of an exemplary fall-protection apparatus.

An exemplary fall-protection apparatus (a self-retracting lifeline) 1 is depicted in FIG. 1. Such an apparatus may comprise a housing 111 that is provided e.g. from a first housing piece 112 and second housing piece 113 that are assembled and fastened together to form the housing. Housing pieces 112 and 113 may be fastened together e.g. by bolts or by any other suitable fasteners. Various ancillary components such as e.g. one or more nuts, bolts, screws, shafts, washers, bushings, gaskets, bearings, labels, auxiliary housing pieces or shields, and the like, are omitted from the Figures herein for ease of presentation of components of primary interest; ordinary artisans will readily appreciate that any such items may be present as needed for the functioning of apparatus 1. In some embodiments, housing 111 may be load-bearing; in some embodiments, a load bracket or similar component may be present and may provide at least a portion of the load-bearing path of the apparatus.

Further details of exemplary apparatus 1 are depicted in FIG. 2, which is a partially exploded view with the second housing piece 113 omitted. Within an interior space at least partially defined by housing 111 is a drum 80, which defines a receiving space 88 (indicated in FIG. 8) into which is wound (e.g., spiral-wound) a length of safety line 115 (with the term line broadly encompassing any elongate, windable load-bearing member, including e.g. webbing, cable, rope, etc., made of any suitable synthetic or natural polymeric material, metal, etc., or any combination thereof). A proximal end of line 115 is connected, directly or indirectly, to drum 80 (such a connection encompasses configurations in which the proximal end of line 115 is connected to a shaft 82 on which drum 80 is mounted). Drum 80 is rotatably mounted within housing 111, e.g. by being rotatably mounted on a shaft 82 and/or by being mounted on a shaft 82 that is rotatable relative to the housing. A biasing member 86 (not visible in FIG. 2 but indicated in generic representation in FIG. 1, and which may be e.g. a suitable spring such as a spiral-coiled torsion spring) may be provided, which serves to bias the drum toward rotating in a direction that will retract safety line 115 onto the drum unless the biasing force is overcome e.g. by movement of a human user.

Apparatus 1 comprises a rotationally-activated braking device 10, as shown in exemplary embodiment in FIG. 2. Such a rotationally-activated braking device relies on one or more pawls 20. Typically, the at least one pawl 20 is co-rotatable with drum 80. By this is meant that the pawls are able to rotate along with drum 80, with the pawl(s) moving in an orbital path about a center of orbital motion that coincides with the axis of rotation of the drum. In various exemplary arrangements illustrated in the Figures herein, such an arrangement is achieved by mounting pawl(s) 20 on a pawl-support plate 40 which is mounted on the same shaft 82 on which drum 80 is mounted. In other words, in at least some embodiments pawl-support plate 40 may be axially co-mounted with drum 80 and may be co-rotatable with drum 80. In some embodiments such a pawl-support plate may be fixed to (e.g. attached directly to) drum 80. In some embodiments, such an arrangement may be achieved e.g. by mounting pawl(s) directly on drum 80, e.g. so that a side flange or wall of drum 80 serves as a pawl-support plate. In such embodiments, pawl-support plate 40 will be in fixed relation with (i.e., will always rotate in unison with) drum 80. In some embodiments as discussed later herein, plate 40 will be configured so that it can rotate slightly relative to drum 80 under some circumstances (e.g. upon exposure to sufficient acceleration in the event of a user fall). However, even in such embodiments, plate 40 will typically rotate in unison with drum 80 the vast majority of the time during ordinary use of apparatus 1.

The one or more pawls 20 are arranged (e.g. mounted on a pawl-support plate 40 as described in detail later herein) so that they can bodily move between a disengaged position and an engaged position. The pawl(s) 20 are configured so that in ordinary use of the fall-protection apparatus, an engaging end 22 of a pawl 20 is maintained in a non-engaged position in which it does not engage with any component (e.g. a ratchet tooth) that would limit the rotation of the drum. This arrangement allows the drum to rotate freely back and forth thus allowing extension and retraction of the safety line in response to movements of a human user of the fall-protection apparatus as the user goes about their workplace activities. In the event that the drum begins to rotate (in direction ω as indicated e.g. in FIG. 4) above a predetermined threshold value of velocity (and/or, in some cases, acceleration, as discussed in detail later herein), at least one pawl 20 is motivated into an engaged position in which the engaging end 22 of the pawl 20 is able to physically contact a tooth of a ratchet to slow or stop the rotation of the drum. Exemplary ratchets 90 and teeth 91 thereof are depicted in exemplary embodiments in various Figures herein; however, it will be appreciated that many ratchet arrangements are possible, as is discussed in detail later herein. Strictly speaking, a pawl will not "engage" with a ratchet tooth until its engaging end actually contacts the tooth. However, for purposes of description, a pawl will be considered to be in an engaged position upon the pawl having been actuated so that its engaging end is in a position (e.g. having moved radially outward) in which it will contact a ratchet tooth upon continued motion of the pawl along its orbital path.

In various Figures herein, some pawls are depicted in an engaged position while others are depicted in a disengaged position. For clarity, in certain Figures herein a pawl that is in an engaged position is subscripted "e" (e.g. $20_e$). It will be appreciated that when the apparatus is in a non-fall situation (e.g. with the drum rotating very slowly or not at all), all such pawls will typically be in a disengaged position (e.g. a "home" position as described later herein).

In use of a rotationally-activated braking device as disclosed herein, engaging of at least one pawl with a tooth of a ratchet will at least slow, e.g. will arrest, the rotation of the drum. With some such braking devices, the rotationally-activated braking device may bring the drum to a "hard stop" in which the rotation of the drum ceases essentially at the instant that the pawl engages the tooth. In many such cases, the safety line of such an apparatus may include a so-called shock absorber (e.g. a tear web or tear strip) to minimize the force experienced by a human user as the user is brought to a halt. (It will be understood that the term "hard stop" is used for convenience in distinguishing such a stop from a more gradual stop that relies on the use of a friction brake as described later herein; the term "hard stop" does not imply that the user is subjected to, e.g., excessively hard forces in being brought to a halt.) With some other such braking devices (e.g. as depicted in various Figures herein), the rotationally-activated braking device relies on a friction brake that, rather than bringing the drum near-instantly to a "hard stop", brings the drum to a halt in a more gradual manner as described in detail later herein. This can minimize the force experienced by a human user as a fall is being arrested, e.g. without requiring the presence of a shock absorber in the safety line.

In use of exemplary fall-protection apparatus 1, an upper, anchorage end 108 of the apparatus may be connected (e.g. by way of connection feature 114) to a secure anchorage (fixed point) of a workplace structure (e.g., a girder, beam or the like). The distal end of line 115 may then be attached (e.g., by way of hook 116) to a harness worn by a worker. As the human user moves away from the fixed anchorage, drum 80 rotates in a first direction (ω) so that line 115 is extended (paid out) from within housing 111. As the user moves toward the fixed anchorage, drum 80 rotates in a second, opposite direction (e.g. under the urging of a torsion spring or other biasing member), so that line 115 is automatically self-retracted within housing 111 and wound upon drum 80. During such user activities, pawl(s) 20 is maintained in a disengaged position in which an engaging end 22 of pawl 20 does not engage a tooth 91 of a ratchet 90 of the rotationally-activated braking device. In the event that the human user falls and causes line 115 to begin rapidly extending from housing 111 and drum 80 to rotate rapidly in direction ω, a leading/engaging end 22 of pawl 20 is caused to move to a position in which it can engage with a ratchet tooth 91 of a ratchet 90 (i.e., is actuated) by the arrangements disclosed herein, whereupon the falling of the worker is arrested as discussed in detail herein.

As disclosed herein, a fall-protection apparatus 1 comprises at least one flexure-borne pawl 20. In many embodiments, multiple such flexure-borne pawls 20 may be present and may be supported by a common pawl-support plate 40, as discussed later herein (noting that in some embodiments a sidewall or flange of drum 80 may serve as a pawl-support plate rather than a separate pawl-support plate 40 being used in the manner of FIG. 2). In some embodiments, three such flexure-borne pawls 20 may be provided, as shown in exemplary embodiment in FIGS. 2-5 herein. Such pawls may be e.g. circumferentially spaced along a circular path (when viewed along the axis of rotation 81 of drum 80, pawl-support plate 40, etc.) around a pawl-support plate 40 in the general manner shown in FIGS. 2-5.

As is evident from the plan view (looking along axis of rotation 81) of FIG. 4, the at least one pawl 20 is configured so that upon rotation of pawl-support plate 40 around its axis of rotation 81, pawl(s) 20 will follow a generally circular orbital path 25 around axis of rotation 81. When drum 80 and pawl-support plate 40 are rotating at a rotational velocity ω below a predetermined threshold value, all such pawls 20 will be in a first, disengaged position. A pawl 20 will be actuated (i.e., caused to move from a first, disengaged position, toward and into a second, engaged position) when the velocity of the pawl 20 along its orbital path exceeds the predetermined threshold value. In some embodiments, a pawl 20 will not be not significantly affected (e.g. actuated) by any acceleration that the pawl may be experiencing, while in other embodiments such a pawl may be actuated by acceleration (and/or the velocity-actuation of the pawl may be modulated by the acceleration), as discussed in detail later herein.

Flexure-Borne Pawl

By a flexure-borne pawl is meant a pawl 20 that is attached to a flexure arm 30. Specifically, a trailing end 23 of pawl 20 will be attached to a leading end 31 of a flexure arm 30. Trailing end 32 of flexure arm 30 will be attached to a flexure arm anchor 50 as shown e.g. in FIG. 3. A flexure arm 30 thus extends from flexure arm anchor 50 to pawl 20, and is elongate along this extent. The path of a flexure arm, from anchor 50 to pawl 20, will often be at least generally circumferential, and may also extend at least generally radially outward, as will be evident from various exemplary arrangements presented in the Figures herein. Often, a flexure arm 30 or set of flexure arms 30 may exhibit a somewhat spiral appearance as evident in several Figures herein. A flexure arm 30 is typically sheetlike or rodlike over much of its elongate length, e.g. so as to exhibit a thickness "t" (as indicated in FIG. 4) that is relatively small (e.g. by a factor of at least 10) in comparison to the overall elongate length of the flexure arm. Flexure arm 30 is configured to deflect (e.g. bend) at least slightly, in a direction that is at least generally radially outward, to allow pawl 20 to move generally radially outward under the influence of centrifugal force as discussed below. It will be understood that this deflection will take the form of reversible deformation that remains within the elastic limit of the material of which the flexure arm is made. It will further be appreciated that this deflection is an extremely low-friction process, the advantages of which are discussed later herein.

A flexure arm anchor 50 from which a flexure arm 30 extends is typically positioned axially adjacent to pawl-support plate 40, e.g. protruding axially away from pawl-support plate 40 (such terminology does not imply that such an anchor 50 must necessarily be an integral portion of plate 40, although in some embodiments it may be). In at least some embodiments, a flexure arm anchor 50 will be fixed in position relative to pawl-support plate 40; e.g., the anchor 50 may be non-movably attached to plate 40. In some embodiments, multiple individual pawls 20 may be respectively connected to multiple individual anchors 50 (e.g. in the form of individual posts). In some embodiments, some or all flexure arm anchors 50 may be integral portions of a pawl-support module 51 as seen most easily in FIG. 3. In some embodiments multiple flexure arm anchors 50 may be circumferentially spaced along the perimeter of a single (e.g. integral) pawl-support module 51, e.g. as in FIGS. 4-5 herein.

Figure 10:
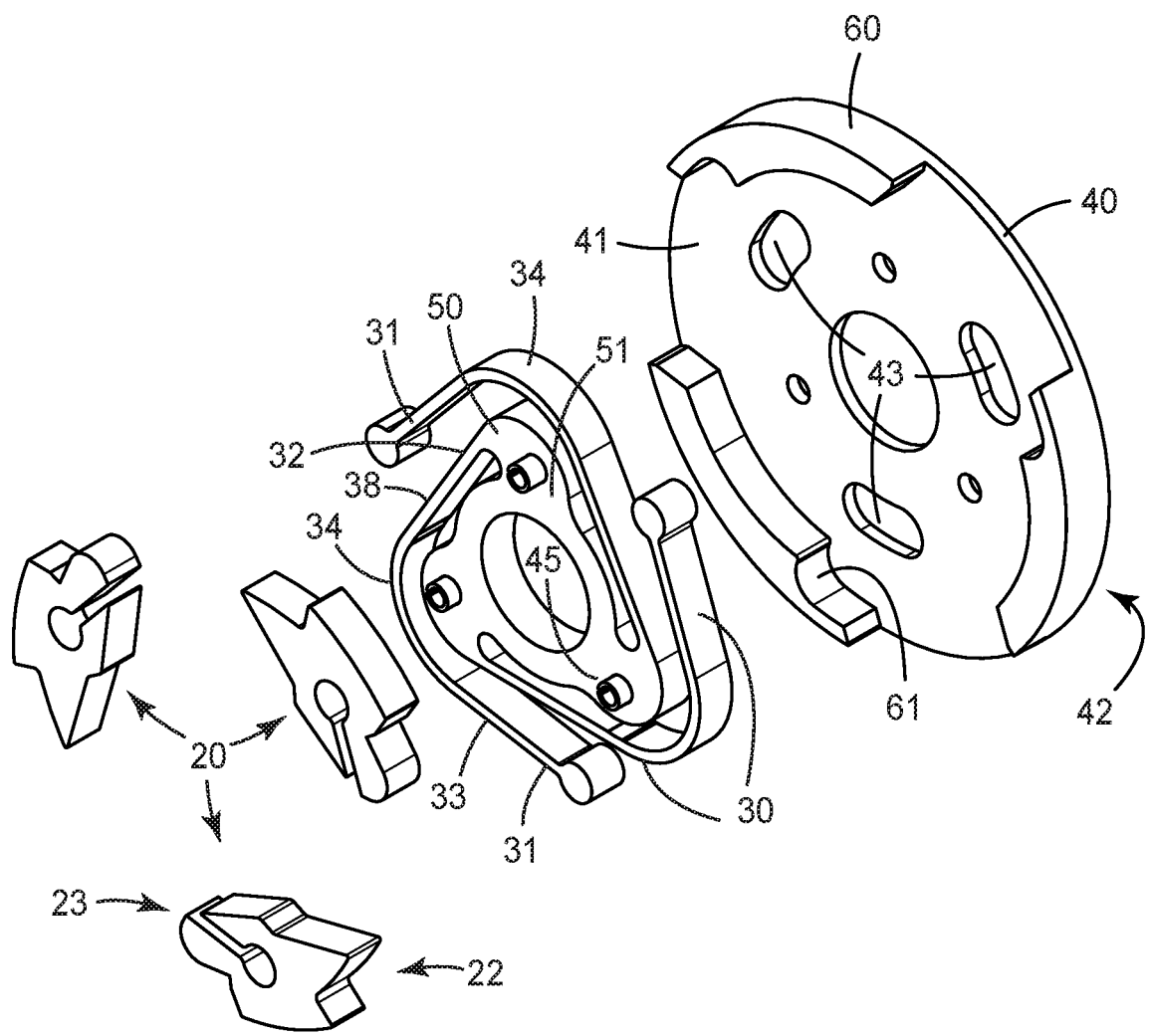
FIG. 10 is an exploded view of some components of FIG. 9.

In some embodiments a pawl 20 and a flexure arm 30 may be made separately and then attached to each other (e.g. as in the design of FIG. 10, discussed later herein). In other embodiments, a pawl and flexure arm may be attached to each other by way of being integral with each other, e.g. as in the design of FIG. 3. Here and elsewhere herein, the term "integral" and like terminology denotes items that are made in a single, common operation (e.g. by molding), as portions of a single unitary component. (By definition, items that are made separately and subsequently joined together are not integral as defined herein.) Similarly, in some embodiments a flexure arm 30 may be made separately from a flexure arm anchor 50 and then subsequently attached thereto. In other embodiments a flexure arm 30 and a flexure arm anchor 50 may be integral. In some embodiments, a pawl, a flexure arm, and a flexure arm anchor 50 may all be integral with each other. For example, pawls and flexure arms may all be integrally connected to a single pawl-support module 51 as noted above and as illustrated in FIG. 3.

Figure 3:
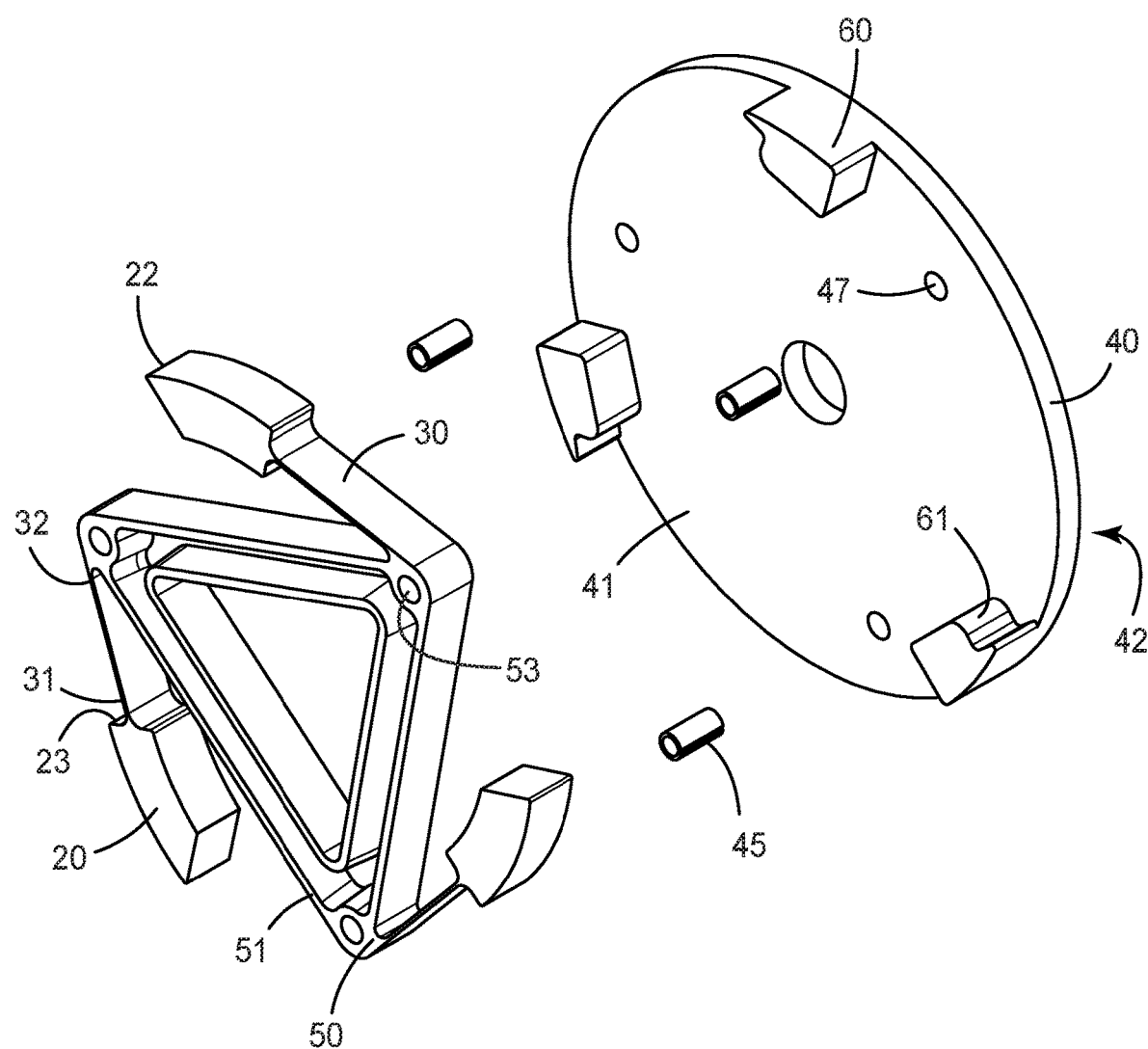
FIG. 3 is an isolated perspective exploded view of particular components of an exemplary fall-protection apparatus.

As is evident from FIG. 3, in some embodiments such a pawl-support module 51 may be separately made from pawl-support plate 40 and may be attached to plate 40 e.g. by way of fasteners 45 that reside in orifices 47 of pawl-support plate 40 and orifices 53 of pawl-support module 51 as shown in FIG. 3. In some embodiments, a pawl-support module 51 (and possibly flexure arms 30) may be integral with pawl-support plate 40 rather than being made separately and then attached thereto. Whatever the particular design, in many embodiments a pawl-support module 51 will be fixed (not rotatable) relative to pawl-support plate 40. The above discussions make it clear that the term flexure arm anchor as used herein, does not require that an anchor must be e.g. a free-standing post; rather, a flexure arm anchor may simply be a local portion of a pawl-support module 51 from which a flexure arm extends.

Figure 5:
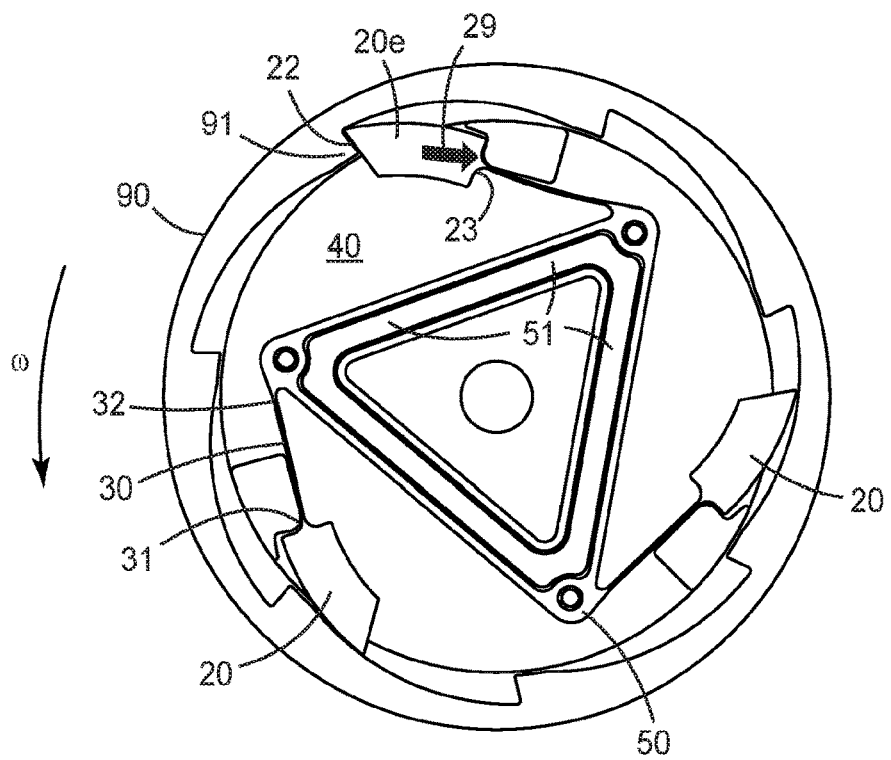
FIG. 5 is a plan view of another exemplary arrangement of flexure-borne pawls.

The functioning of a flexure-borne pawl 20 may be appreciated based on FIGS. 4 and 5, which are plan views looking along axis of rotation 81. (These are conceptual views with various items omitted so that certain items and their function can be highlighted.) Pawls 20 and flexure arms 30 are configured so that when drum 80 (not shown in FIGS. 4 and 5), pawl-support plate 40, and pawls 20, are not rotating (or are rotating slowly), pawls 20 will remain in a disengaged position as shown in FIG. 4. Upon rotation of the drum, pawl-support plate 40, and pawls 20 above a predetermined threshold value of rotational velocity $\omega$, at least one of the pawls will be urged by centrifugal force, generally radially outward as indicated by block arrow 28 of FIG. 4. This centrifugal force will be high enough to overcome the resistance of flexure arm 30 to bending, thus flexure arm 30 will deflect slightly to allow this motion. This will place pawl 20 in an engaged position in which an engaging end 22 of the flexure-borne pawl 20 can contact a tooth 91 of the ratchet 90 as illustrated by the particular pawl denoted $20_e$ in FIG. 5. (The other two pawls in FIG. 5 are shown as having moved radially outward to an engaged position but have not actually contacted a ratchet tooth.)

Bodily Movement of Pawl

By definition, a flexure-borne pawl 20 as disclosed herein will move generally radially outward from the disengaged position toward and into the engaged position, in a bodily manner. By moving "bodily" is meant that the pawl moves generally radially outward as a whole, in its entirety. That is, while in some instances the "leading" end 22 of a pawl 20 may move further radially outward than the "trailing" end 23 of the pawl 20, no portion of the pawl will move radially inward rather than outward. A flexure-borne pawl is thus distinguished from, for example, a conventional pivot-mounted pawl that comprises a pivot point that is located within the perimeter of the pawl. Such a pivot-mounted pawl is actuated by way of an engaging end of the pawl moving radially outward, and an opposite end of the pawl moving in the opposite direction, radially inward. (Some pivot-mounted pawls work in reverse fashion to this; however, such a pawl still has a portion that moves inward, and a portion that moves outward). In many embodiments, the only type of pawls that will be present in an arrangement as disclosed herein will be flexure-borne pawls, e.g. no pivot-mounted pawl or pawls will be present.

The use of flexure-borne pawls can advantageously minimize the amount of friction that arises in operation of the pawls. That is, a pivotal connection by which a pivot-mounted pawl is mounted to e.g. a post of a pawl-support plate, may exhibit friction due to the sliding of one surface against another as the pawl pivots. This friction may vary based e.g. on manufacturing tolerances, the presence of even small amounts of debris into the pivotal connection, and so on. In contrast, a pawl that is moved purely by the flexing of a flexure arm does not involve sliding of one surface against another to any significant extent. (In particular, in many embodiments pawls 20 and flexure arms 30 will be positioned so that they do not contact major surface 41 of pawl-support plate 40 to an extent that gives rise to significant frictional interaction.) The use of flexure-borne pawls can thus enhance the performance of a rotationally-activated braking device e.g. by minimizing variability in operating performance due to friction. It will also be appreciated that the use of flexure-borne pawls may offer advantages e.g. in terms of fewer parts being needed, and/or in allowing the use of a simplified manufacturing process.

Ordinary artisans will appreciate that a flexure-borne pawl differs from a conventional pivot-mounted pawl in another aspect. Typically, a pivot-mounted pawl is biased by way of a biasing member (e.g. a spring) that serves to urge the pawl in a particular direction, which is typically limited by a physical stop. Thus, the biasing member (e.g. spring) of a pivot-mounted pawl typically experiences at least some minimal force (e.g. tension) even when the apparatus is not being used. In contrast, in some embodiments, when apparatus 1 is not being used, a flexure-borne pawl may be in a disengaged position that is a "home" position (i.e., a "neutral" position that the pawl will inherently assume when the drum is not rotating, or is rotating very slowly). In such a home position, the flexure arm 30 will not be experiencing any force that urges it radially inward or outward (in some instances, the only force that is operating may be gravity). It is only when (upon sufficient rotation of the drum) the pawl is urged radially outward by centrifugal force, that the flexure arm becomes flexed and thus develops a restoring force that acts as a biasing force that opposes the tendency of the pawl to move further outward. Thus, a flexure arm configured in this manner may not be subject to a near-continuous force in the manner of a conventional spring of a conventional pivot-mounted pawl. However, if desired, in some embodiments a physical stop may be provided that, for example, may prevent the flexure arm from e.g. moving too far radially inward in the event that the apparatus is jostled or dropped. In some embodiments, such a physical stop may be positioned so that it causes the flexure arm to reside at least slightly away from (e.g. radially outward of) what would otherwise be its natural, "home" position.

Based on the disclosures herein, ordinary artisans will appreciate that various design parameters (e.g. the size, shape, mass, mass distribution, etc. of the pawls; and/or, the length, shape, thickness, and, in particular, the flexural modulus and bending stiffness, of the flexure arm) may be chosen in combination to provide that the pawl is actuated from a disengaged position to an engaged position at a predetermined threshold of rotational velocity.

Figure 6:
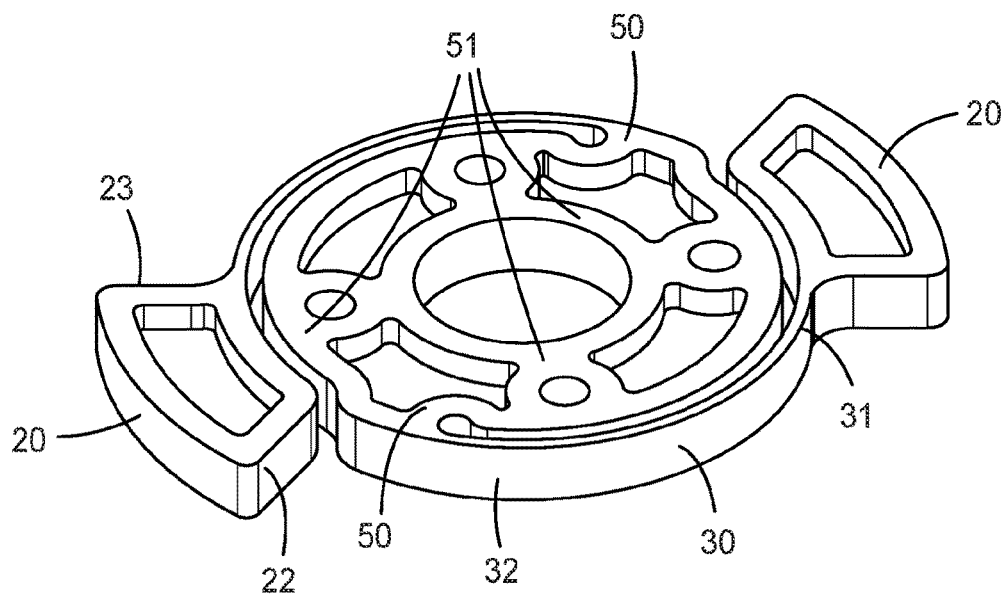
FIG. 6 is a perspective view of another exemplary arrangement of flexure-borne pawls.
Figure 7:
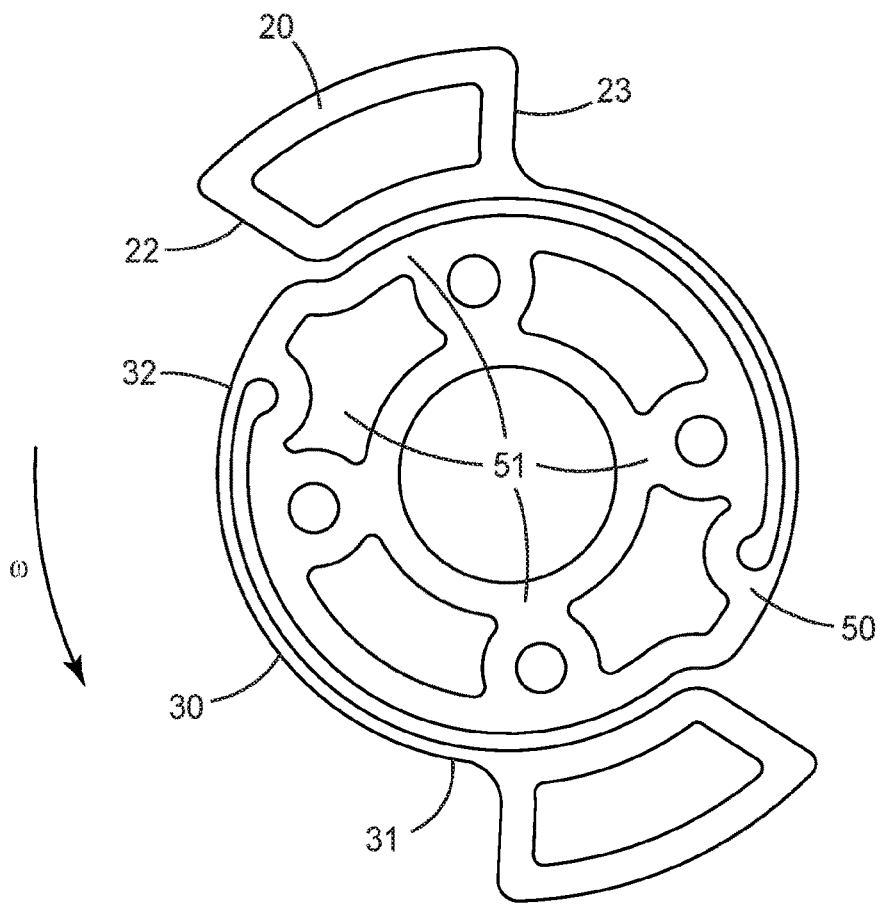
FIG. 7 is a plan view of the exemplary arrangement of pawls of FIG. 6.

One design parameter is the number of flexure-borne pawls that are present. In some embodiments, a single pawl may be used. In other embodiments, three pawls may be used, e.g. as in the exemplary arrangements of FIGS. 2-5. FIGS. 6 and 7 illustrate an exemplary design in which two pawls are used (in these Figures, the various components use the same numbering as for corresponding components in FIGS. 2-5). Any greater number of pawls (e.g. four pawls), may be used if desired. In embodiments in which pawls are provided in pairs (e.g. one pair of pawls, or two pairs for four pawls total) the pawls 20 of any such pair may be located in circumferentially-opposing positions from each other (i.e., on opposite sides of the axis of rotation 81 of drum 80 and pawl-support plate 40, when viewed along axis of rotation 81). A pair of such oppositely-located flexure-borne pawls is depicted in exemplary embodiment in FIGS. 6 and 7. Each such pawl comprises a leading end 22 and a trailing end 23, and is attached to a leading end 31 of a flexure arm 30. The trailing end 32 of each flexure arm is attached to a flexure arm anchor 50; each such flexure arm anchor 50 is an integral component of a pawl-support module 51. In the exemplary arrangement of FIGS. 6 and 7, pawls 20, flexure arms 30, and flexure arm anchors 50, are all integral with a single, integral pawl-support module 51.

Comparison of FIGS. 4-5 and 7 reveal another useful design parameter, which is the amount of circumferential "wrap" exhibited by the combination of a pawl 20 and the flexure arm 30 that bears the pawl. Such wrap may be characterized by the angle between two lines—one drawn from axis of rotation 81 to the tip of leading end 22 of pawl 20, the other drawn from axis of rotation 81 to the location at which the trailing end 32 of flexure arm 30 meets flexure arm anchor 50. In various embodiments, any particular pawl and its associated flexure arm may exhibit a wrap of at least 30, 45, 60, 90, 120, 150, or 180 degrees. In further embodiments, a pawl/flexure arm may exhibit a wrap of no more than 260, 200, 165, 135, 100, or 70 degrees. (In general, the greater the degree of "wrap", the more a set of pawls and flexure arms may exhibit a shape that resembles a spiral.) By way of specific examples, the exemplary pawls/flexure arms of FIG. 4 exhibit a circumferential wrap in the range of approximately 75 degrees; the exemplary pawls/flexure arms of FIG. 7 exhibit a circumferential wrap in the range of approximately 155 degrees. The design shown in FIG. 11 (which includes three flexure-borne pawls and which will be discussed in detail later herein) exhibits a circumferential wrap in the range of approximately 200-210 degrees. It will be appreciated that the use of a large amount of circumferential wrap can allow a flexure arm to be relatively long and thus can allow a desired flexibility of the flexure arm to be achieved without, for example, requiring the flexure arm to have an extremely small thickness.

Various Figures herein (e.g. FIGS. 4, 5, 7, and the later-discussed FIGS. 11 and 12) depict an arrangement in which flexure arms are forwardly wrapped. By this is meant that the flexure arms extend from their respective anchors to their junction with the pawls, in a direction that coincides with the above-described rotation direction (i.e., the direction of fall-induced rotation), as evident e.g. from FIG. 4. In such an arrangement, the flexure arms are thus "pushing" the pawls in the rotation direction as the drum rotates. However, in some embodiments this can be reversed, so that the flexure arms extend from their anchors to their junction with the pawls, in a direction that is opposite the rotation direction. This will be referred to as a configuration in which the flexure arms are rearwardly wrapped; in such an arrangement, the flexure arms will be "pulling" the pawls in the rotation direction as the drum rotates. In such a design, the end of each pawl at which the flexure arm approaches the pawl will be the leading end of the pawl, and will be the engaging end that engages with a ratchet tooth. The opposing end of the pawl will be the trailing end.

Figure 11:
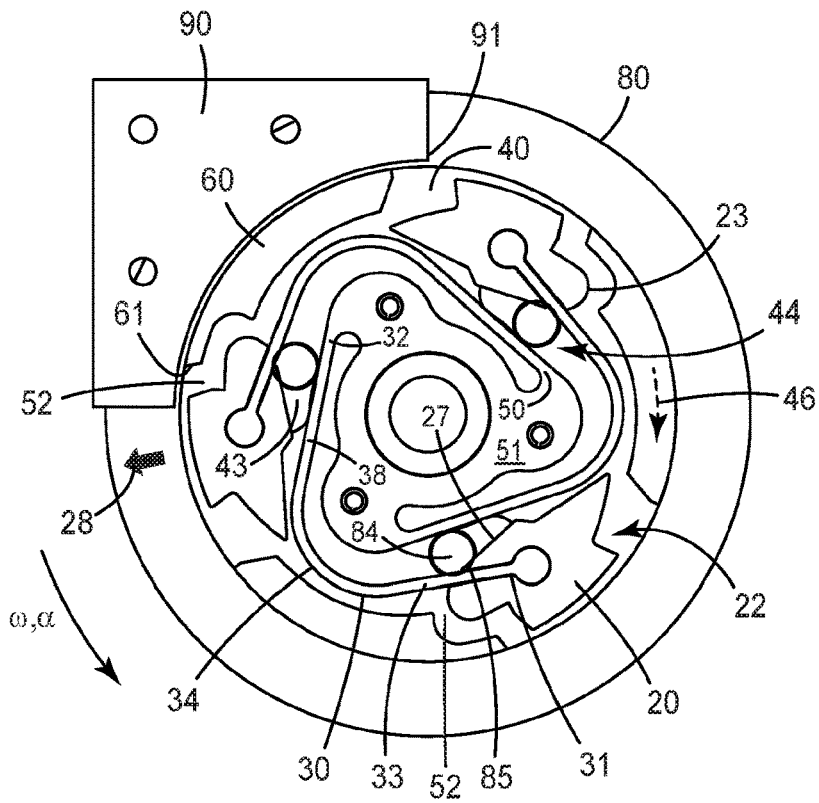
FIG. 11 is a plan view of another exemplary arrangement of flexure-borne pawls.

Inspection of FIGS. 4, 7 and 11 reveals additional useful design parameters. For example, in various embodiments the long axis of at least a portion of a flexure arm 30 may have a selected orientation in relation to the orbital path (e.g. orbital path 25 as denoted in FIG. 4) followed by the pawl 20 that is borne by that flexure arm. Thus in various embodiments, a long axis of a flexure arm 30 may be locally aligned with an orbital path to within a desired local alignment angle, along a chosen percentage of the elongate extent of the flexure arm. For example, inspection of FIG. 7 reveals that in this design, substantially the entire length of each flexure arm 30 is locally aligned (e.g. so as to exhibit a local alignment angle of less than plus or minus 5 degrees, e.g. of 0 degrees) with an orbital path that will be traced out by pawls 20, upon rotation of the drum with which this set of pawls is used. Inspection of FIG. 4 reveals that in this design, substantially the entire length of these flexure arms 30 is locally aligned within approximately 30 degrees of the orbital path that will be traced out by pawls 20. It is evident that in the design of FIG. 4, the local alignment is not as constant along the length of flexure arm 30 as it is in the design of FIG. 7; that is, in FIG. 4 the local alignment appears to vary from 0 degrees (exactly locally parallel, at certain locations) to approximately 30 degrees. Although it differs in other respects from the design of FIG. 4, the design of FIG. 11 similarly appears to exhibit a local alignment angle that varies, over the length of flexure arm 30, from 0 degrees to approximately 30 degrees.

In various embodiments a flexure arm may exhibit a local alignment angle, over any specified extent of the elongate length of a flexure arm, of e.g. less than plus or minus 70, 50, 40, 30, 20, 10, or 5 degrees. In further embodiments, any of these conditions may hold over at least 20, 40, 60, 80, 90, 95, or essentially 100% of the elongate length of the flexure arm. The measurement of such a local alignment angle, at any location along the elongate length of a flexure arm, can be performed as follows. At the desired point on the flexure arm, a first line is drawn that coincides with the long axis of the flexure arm at least at that point (if the flexure arm is arcuate at that point, a line is drawn that is tangent to the flexure arm at that point). A second line is drawn from axis of rotation 81, radially outward through that point. The second line is continued radially outward until it intersects the orbital path traced out by the pawl borne by that flexure arm. A tangent to the orbital path is drawn at this point of intersection, which provides a third line. The angle between the third line and the first line provides the above-enumerated local alignment angle.

Inspection of FIGS. 4, 7 and 11 reveal further variations that can be accommodated or advantageously used. For example, in some embodiments a flexure arm 30 may be relatively straight along its entire length, as in the design of FIG. 4. In some embodiments a flexure arm 30 may be at least generally uniformly arcuate (i.e. with a local radius of curvature that does not vary by more than e.g. 20, 10, 5, or 2%) along the entire length of the flexure arm, as in the design of FIG. 7. In some embodiments, a flexure arm may comprise a leading segment 33 and a trailing segment 38 that are connected by an elbow 34, as in the design of FIG. 11. In some such embodiments, segments 33 and 38 may be relatively straight, with elbow 34 being more arcuate, also as evident in FIG. 11. These various exemplary designs make it clear that a flexure arm 30 may vary from being e.g. uniformly arcuate along most or all of its elongate length, to comprising any number of relatively straight segments interspersed with any desired number of e.g. sharply curved segments.

In some embodiments, the thinnest dimension of the flexure arm (e.g. thickness "t" as denoted in FIG. 4) may be oriented in a generally radially inward-outward direction, along at least a portion of the elongate length of the flexure arm. In other words, at any particular point along the elongate length of the flexure arm, the thickness "t" of the arm at that point may be at least generally aligned with a line that is drawn from axis of rotation 81 through that point. In various embodiments, the thickness "t" may be aligned within plus or minus 50, 30, 20, 10, or 5 degrees of radially inward-outward, e.g. along at least 20, 40, 60, 80, 90, or 95% of the elongate length of the flexure arm.

Various figures herein depict exemplary arrangements in which a relatively sharp demarcation is present between a pawl 20 and a flexure arm 30 to which the pawl is attached. However, this is not necessarily required. For example, a flexure arm could gradually increase in thickness (whether smoothly or stepwise) from its trailing end to its leading end, with a leading portion of the flexure arm being sufficiently thick (and e.g. massive) to serve as a pawl. All such designs fall within the overall concept of a flexure-borne pawl and a flexure arm to which such a pawl is attached. Furthermore, although the Figures herein depict flexure arms that are relatively uniform in thickness, and uniform in width (in the axial direction), this does not necessarily have to be the case. Although the Figures herein depict flexure arms that are in the form of a single, uninterrupted piece, this does not necessarily have to be the case. For example, in some embodiments a flexure arm could comprise an elongate slot that extends along the long axis of at least a portion of the flexure arm; in fact, in some embodiments a pawl could be connected to a flexure anchor by way of two (or more) elongate flexure arms that are separate from each other along a portion, or the entirety, of their length.

Still further, the concept of a pawl that is "attached" to a flexure arm does not necessarily require that the pawl must be permanently attached, e.g. adhesively bonded or welded, to the flexure arm. Rather, in some embodiments a pawl may e.g. comprise a slot and a seating cavity configured to respectively accept a leading portion of the flexure arm and an enlarged seating head at the terminal end of the flexure arm. The enlarged seating head and leading portion of the flexure arm may be inserted into these openings e.g. as shown in FIG. 11 to attach the pawl to the flexure arm. Arrangements of this general type fall within the overall concept of a pawl that is attached to a flexure arm.

Any of the above-described components may be made of any suitable material. In particular, the flexure arms may be made of a material with a suitable flexural modulus (and with properties that will be maintained over aging). In many embodiments, the flexure arms may be made of a suitable metal, e.g. stainless steel. In some embodiments, the flexure arms may be made of a suitable engineering plastic, e.g. polyether ether ketone (PEEK), acrylonitrile-butadiene-styrene (ABS) polymers, carbon-fiber reinforced polymers (of any suitable polymeric composition), and so on. In some convenient embodiments, the flexure arms may be made by injection molding of any such material. In some embodiments flexure arms, pawls that are attachable to flexure arms; or, a pawl-support module that integrally includes flexure arm anchors, flexure arms, and, in some embodiments, the pawls themselves, may be made of injection-molded metal.

In some particular embodiments, flexure arms and/or pawls that are attachable to flexure arms; or, a pawl-support module that integrally includes flexure arm anchors, flexure arms, and, in some embodiments, the pawls themselves, may be made of an amorphous metal. By an amorphous metal is meant a metal or metal alloy (most such materials are in fact alloys) that exhibits a disordered, i.e. non-crystalline, atomic-scale structure that is characterized by a near-complete absence of grain boundaries. (Such materials are sometimes referred to as bulk metallic glasses.) In many embodiments, such a material may be molded to form a flexure arm or even to form an entire pawl-support module and integral flexure arms (and optionally, pawls) thereof. Such materials may have unique properties (e.g., a combination of flexural modulus, yield strength, and durability) that render them highly useful to serve as flexure arms for the uses herein. Such materials may be made of any suitable alloy (e.g. a zirconium-based alloy) and may be formed into the desired items by any suitable method, e.g. by injection molding Buttress The above discussions make it clear that it is advantageous to select the properties (e.g. flexural modulus and bending stiffness, yield strength, and so on) of a flexure arm 30 in view of the desired relationship between the centrifugal force exerted on the flexure arm as a result of rotation, and the resulting amount of radially outward displacement of the pawl. To provide the most unrestricted design space within which to operate in regard to the flexure arm, arrangements can be made that relieve other design constraints that might otherwise be present.

For example, in some embodiments a pawl-support plate 40 may comprise at least one buttress 60 that protrudes axially from the pawl-support plate (e.g. from major surface 41 of plate 40, on the same side of the plate that the pawls and flexure arms are present), as shown in exemplary embodiment in FIG. 3. In some embodiments, such a buttress 60 can be an integral part of pawl-support plate 40;

in other embodiments, such a buttress may be made separately and then attached to plate 40. Such a buttress 60 can be positioned so that at least a portion of the buttress 60 is positioned circumferentially rearward of at least a portion of the trailing end 23 of pawl 20, as shown in exemplary embodiment in FIG. 4. (Often, at least a portion of the buttress may be positioned at least generally radially outward of at least a portion of pawl 20, also as evident in FIG. 4).

A buttress 60 will comprise a contact surface 61 (indicated in FIGS. 3 and 4) that is configured to be contacted by a portion of trailing end 23 of pawl 20 under certain conditions, as explained below. Typically, pawl 20 and buttress 60 are configured so that a circumferential gap 52 (which may be relatively small, as evident in FIG. 4) is present between contact surface 61 of buttress 60, and trailing end 23 of pawl 20, e.g. at their point of closest approach. Gap 52 will typically be present when the pawl is in a disengaged position (in other words, during ordinary use of apparatus 1, no portion of pawl 20 will typically be in contact with any portion of buttress 60). Such a gap 52 may be present momentarily after pawl 20 has moved radially outward into an engaged position, before being eliminated as described below.

In a braking (e.g. fall-arrest) operation, a pawl 20 will move generally radially outward so that a leading end 22 of the pawl engages with a tooth 91 of a ratchet 90, as described earlier herein and as shown in FIG. 5. This will bring pawl 20 to a sudden stop and will develop considerable force on the pawl 20, acting in a generally circumferentially-rearward direction as indicated by block arrow 29 in FIG. 5. This force will urge pawl 20 slightly circumferentially rearward far enough to close gap 52 and thus to cause at least a portion of trailing end 23 of pawl 20 to come into contact with the contact surface 61 of buttress 60. In other words, engaging of the leading end of the pawl with the ratchet can cause the trailing end of the pawl to be "jammed" into the leading end of the buttress.

Buttress 60 can be configured to be extremely strong (e.g. in comparison to flexure arm 30). Buttress 60 can thus bear, and dissipate, at least a portion of the force that is developed on the pawl upon the engaging of the pawl with the tooth of the ratchet. In various embodiments, the buttress may bear and dissipate a significant amount of this force (e.g. 60, 80, 90, 95, 98, or essentially 100% of the force).

Any number of buttresses may be used, e.g. one, two, three, four or more. In some embodiments, the number of buttresses may equal the number of pawls (e.g., three and three as in the design of FIG. 2, or two and two as in the design of FIG. 14, which is discussed in detail later herein). In many such embodiments, each buttress may be positioned in relation to a particular pawl so that upon engaging of the pawl with a ratchet tooth, the pawl will be jammed against that particular buttress.

It will be appreciated that the providing of a buttress in this manner can substantially eliminate any need to strengthen flexure arm 30 to be able to bear the full amount, or even a significant portion, of the force that develops when the pawl engages a ratchet tooth. This allows the flexure arm to be designed (e.g. with a relatively small thickness "t") to allow the arm to exhibit flexibility commensurate with a desired force-displacement relationship. Otherwise, a flexure arm that is optimized to provide the desired flexibility might, for example, irreversibly deform (e.g. buckle or accordionize) under the large force that develops when the pawl engages a ratchet tooth in the course of arresting a fall. Thus according to the present arrangements, in a fall-arrest event, a pawl 20 may be urged slightly circumferentially rearward in such manner as to e.g. momentarily slightly deflect its flexure arm 30; however, such deflection will be below the elastic limit of the flexure arm and will be reversible.

The above discussions have concerned the use of a buttress with a forwardly-wrapped configuration of flexure arms and pawls as defined and described previously herein. In some embodiments, a rearwardly-wrapped configuration of flexure arms and pawls may be used. In such cases, any such buttress(es) can be used and can still be configured so that the engaging of the leading end of a pawl with a ratchet will cause the trailing end of the pawl to be "jammed" into the leading end of the buttress. The primary difference will be that in this case the trailing end of the pawl will be the end that is generally opposite the end from which the flexure arm approaches the pawl.

In some embodiments, the trailing end 23 of pawl 20, and contact surface 61 of buttress 60, may exhibit complementary shapes to ensure that trailing end 23 is guided into a desired contact position with buttress 60. Any such design should also ensure that the pawl can be separated from contact with the buttress 60 after the force is removed. This is in view of the fact that some fall-protection apparatus are occasionally subjected to "lock-up" testing e.g. in which an operator pulls rapidly on the safety line 115 to ensure that the braking device properly engages to arrest the motion. At the end of such a test, the apparatus and braking device thereof should return to their previous, disengaged-and-ready, condition. Thus, a buttress 60 (and other components of the braking device) should be configured to provide that the actuation of a flexure-borne pawl is not an irreversible process. Exemplary designs that may facilitate these characteristics are visible in FIGS. 3 and 4, and particularly in FIGS. 10-12.

The value of velocity that causes a flexure-borne pawl 20 to be actuated can be set as desired. Such a velocity threshold may be set to any suitable nominal value, e.g. 6, 8, or 10 feet per second. Such a nominal value will correspond to the linear velocity experienced by the extended portion of safety line 115 (and thus to a user connected thereto). This can be converted to an actual value of rotational velocity of pawl 20 in view of the specific design parameters of the fall-protection apparatus (e.g. the diameter of the drum from which the safety line is unwound, the diameter of the orbit of the pawl, and so on). This can be used to set particular parameters (e.g. the bending stiffness of a flexure arm 30, and so on) to ensure that pawl 20 is actuated at a rotational velocity that corresponds to the desired threshold of velocity experienced by the user.

Although in many embodiments a flexure arm may be the only item and mechanism by which the force-displacement relationship of a flexure-borne pawl is established, in other embodiments one or more additional methods of biasing may be used as an adjunct to the flexure arm. For example, in some embodiments one or more biasing springs (e.g. coil springs acting in tension) may be present and may be operatively connected to a flexure-borne pawl and/or to the flexure arm. In other embodiments, magnetic biasing may be used as an adjunct to the flexure arm. For example, in some embodiments a magnet may be installed in a side of a pawl-support module, e.g. directly across from a flexure-borne pawl (and separated therefrom by a gap of the type readily visible e.g. in FIG. 7). A magnet may be installed in the pawl in addition to, or instead of, a magnet being present in the pawl-support module. That is, depending e.g. on the metal of which the pawl and/or the pawl-support module is made, in some embodiments only one magnet, interacting with a suitable metal, may be sufficient to achieve the desired effects. In other embodiments a pair of magnets may be used, acting on each other in combination. Any such magnet(s) may be configured to achieve an attractive force or a repelling force that may act in combination with the stiffness of the flexure arm to provide a desired force-displacement relationship.

Acceleration-Actuation

The discussions above have concerned arrangements in which actuation of a pawl is caused by the velocity of the pawl along its orbital path. It will be appreciated that such a pawl may also be subjected to acceleration (e.g. the rate at which drum 80 rotates may rapidly increase with time). In some embodiments, any such flexure-borne pawl may be configured to be relatively insensitive to acceleration. In other embodiments, depending on the design, the presence of acceleration may e.g. slightly augment the actuation due to velocity, or slightly reduce or retard the actuation due to velocity. In many embodiments, the pawl(s) and flexure arm(s) may be configured so that any such effect of acceleration is relatively insignificant.

However, in some embodiments, a rotationally-activated braking device of a fall-protection apparatus may be configured to purposefully rely on acceleration for actuation (and/or for modulation of the response to velocity) in at least some circumstances. Thus in some embodiments, upon rotation of drum 80, one or more pawls 20, and so on, above a predetermined threshold of acceleration (a), pawl 20 will be urged bodily away from a disengaged position, radially outward toward and into an engaged position in which it engages a tooth of the ratchet.

One general approach to providing acceleration-actuation relies on purposeful control of the relationship of pawl-support plate 40 and drum 80. In some embodiments (e.g. that rely largely or completely on velocity-actuation of pawls) as described previously herein, a pawl-support plate 40 and a drum 80 have a fixed relationship so that plate 40 is not able to rotate relative to drum 80 and vice versa. For example, in some embodiments a pawl-support plate 40 may be fixedly attached to (e.g. bolted to), drum 80. Alternatively, or in addition to this, both plate 40 and drum 80 may be keyed to common shaft 82 so that they cannot rotate relative to each other. In some embodiments a pawl-support plate 40 and a drum 80 may sandwich a layer of friction material 122 therebetween, as shown in FIG. 2. Such a configuration allows that, in the event that the rotation of plate 40 is stopped upon a pawl being actuated, limited rotation of drum 80 relative to plate 40 may occur before being stopped by the action of the friction material, as discussed later herein. Such an occurrence still requires a great deal of force in order for any relative rotation of plate 40 and drum 80.

In contrast, in some embodiments, pawl-support plate 40 and drum 80 may be configured so that they are relatively easily able to rotate relative to each other through a predetermined arc of partial rotation of e.g. at most 90 degrees, 180 degrees, or 270 degrees. That is, they may be configured so that they can rotate relative to each other due to an acceleration-derived force arising from a user fall, rather than being fixed to each other or only being able to rotate relative to each other upon being exposed to a very high force such as encountered when a pawl is engaged with a ratchet. However, even with this greater ability to rotate relative to each other, the vast majority of the time (e.g. during ordinary use in the absence of acceleration due to a fall event), the pawl-support plate will usually remain in a "home" position relative to the drum, with the drum and the pawl-support plate rotating in lockstep.

Figure 9:
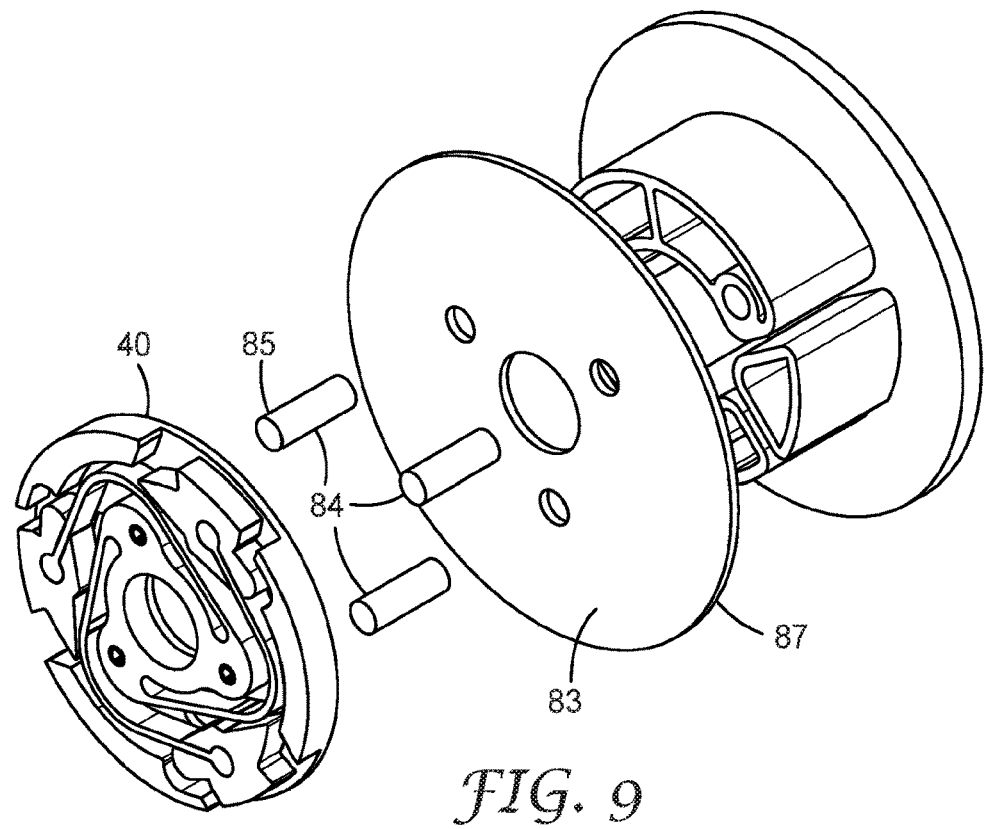
FIG. 9 is a partially exploded view of the components of FIG. 8.

One arrangement that can achieve such functioning is depicted in FIG. 8 and in partially exploded view in FIG. 9. These views depict a drum 80, pawl-support plate 40, and pawls 20. Other components are omitted for clarity, but it will be appreciated that such components can be provided in a fall-protection apparatus e.g. of the general type shown in FIGS. 1 and 2, with the items shown in FIGS. 8 and 9 being substituted for the corresponding items of FIG. 2. In such embodiments, no layer of friction material is present between drum 80 and pawl-support plate 40. Moreover, if desired, a major sidewall 87 of drum 80, which sidewall comprises a major surface 83 that may be in at least occasional contact with a major surface of 42 of pawl-support plate 40, may have a low coefficient of friction. In some embodiments, the entirety of drum 80 may be made of a material that has a low coefficient of friction. In other embodiments, sidewall 87 be a separately made item (as evident in FIG. 9) that is chosen to have a low coefficient of friction. For example, such a sidewall 87 may be made of e.g. poly(oxymethylene), poly(tetrafluoroethylene), and similar organic polymeric materials. Alternatively, the major surface 83 of sidewall 87 (and/or major surface 42 of plate 40) may be treated, coated, or otherwise configured to have a low coefficient of friction. Or, a low-friction spacer (e.g. a disc made of poly(oxymethylene) may be present between plate 40 and sidewall 87). Any such arrangement or combination thereof can provide that plate 40 and drum 80 are able to rotate relative to each other to a sufficient amount to achieve the effects described below.

Camming Bollards

With the necessary freedom of rotation of pawl-support plate 40 and drum 80 relative to each other being present, the desired acceleration-actuation can be provided by using one or more camming bollards 84 as shown in exemplary embodiment in FIG. 9. A camming bollard 84 will be in a fixed position relative to drum 80 (although it may not necessarily need to be attached or bonded to drum 80; e.g., it may be sufficient that an end of the bollard is seated in a cavity provided in drum 80 as shown in FIG. 9). Camming bollard 84 protrudes axially from drum 80 (toward the side of the drum that the pawl-support plate, pawls, and so on, are present, as is evident in FIG. 9). Camming bollard 84 extends through an elongate slot 43 in pawl-support plate 40 (slots 43 are most easily visible in the isolated exploded view of FIG. 10, noting that the camming bollards 84 are omitted from this Figure). This provides that a portion of camming bollard 84 resides within a space 44 that is radially inward of pawl 20 and/or is radially inward of a leading segment of flexure arm 30. This arrangement is most easily seen in FIG. 11, which is a plan view looking along the axis of rotation of the drum and pawl-support plate.

Such an arrangement can be configured so that upon acceleration of drum 80 (in the direction denoted ω, α in FIG. 11) above a predetermined threshold value of acceleration α, pawl-support plate 40 will rotate circumferentially rearwardly (away from plate 40's "home" position relative to drum 80), in the direction indicated by arrow 46 in FIG. 11. In other words, due to the freedom of pawl-support plate 40 and drum 80 to rotate relative to each other, acceleration of drum 80 will cause support plate 40 to momentarily "lag" behind drum 80, due to the mass of the support plate, pawls, and so on. This will cause each pawl 20 to move circumferentially rearwardly relative to drum 80 and thus relative to a camming bollard 84 that is in a fixed position on drum 80. This movement of pawl 20 will cause a radially-inward contact surface 27 of pawl 20 to impinge on camming (contact) surface 85 of camming bollard 84. This impingement will have the effect that, as pawl 20 slidably moves circumferentially rearward relative to camming bollard 84, bollard 84 will urge pawl 20 generally radially outward. Pawl 20 will thus be motivated generally radially outward, toward and e.g. into an engaged position in which an engaging end of the pawl engages a tooth of the ratchet, as can be seen by inspection and comparison of FIGS. 11 and 12. The movement of pawl 20 will be "bodily" movement as described earlier herein.

Figure 12:
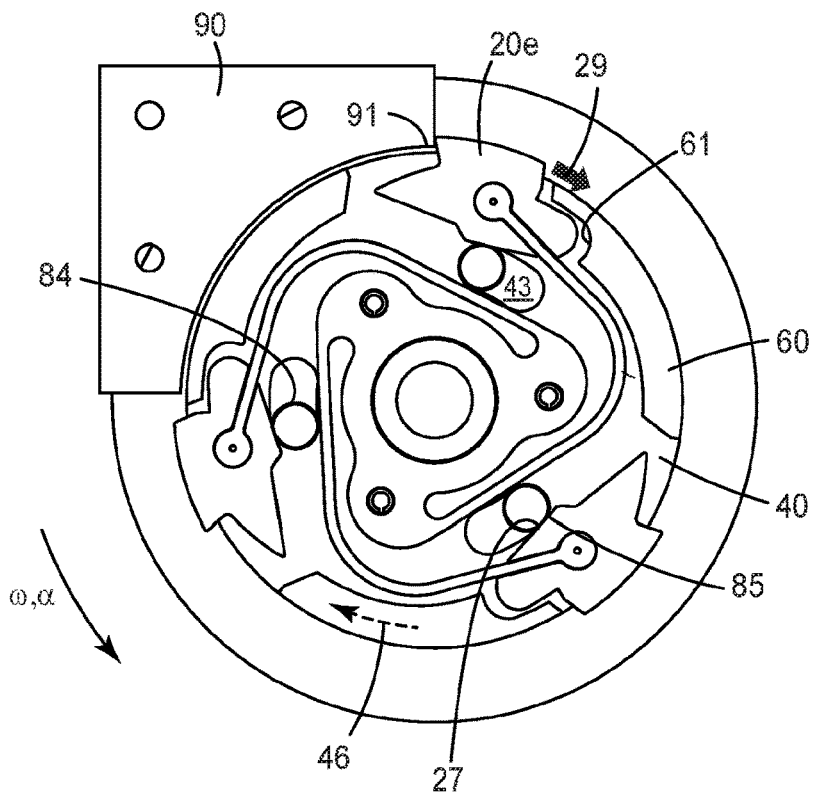
FIG. 12 is a plan view of another exemplary arrangement of flexure-borne pawls.

As evident from FIGS. 11 and 12, radially-inward contact surface 27 of pawl 20 may be configured so that impingement of this surface on camming surface 85 causes pawl 20 to be urged generally radially outward (in some embodiments pawl 20 may also be urged slightly circumferentially rearward, as well). To achieve this, contact surface 27 may be a radially-inwardly-sloping surface. By this is meant that as surface 27 is traversed in a leading direction (the direction of rotation ω), the surface is located further and further radially inward, as is evident from FIG. 11. This, combined with the above-described flexibility of flexure arm 30, provides that as pawl 20 slidably moves along camming surface 85 of camming bollard 84, pawl 20 will be urged bodily outward.

To facilitate this functioning, the elongate slot 43 in pawl-support plate 40, through which camming bollard 84 extends, may exhibit a long axis that is at least generally locally aligned with the orbital path followed by pawl 20, as is evident from FIGS. 11 and 12. In some embodiments a camming bollard 84 may be positioned in the above-mentioned space 44 so that when the drum and pawl-support plate are not rotating (or are rotating very slowly), camming bollard 84 is not in contact with any portion of pawl 20 or flexure arm 30. In other embodiments (e.g. as evident in FIG. 11), under such a condition, camming bollard 84 may be in contact with a portion of pawl 20 and/or flexure arm 30. Camming bollard 84 thus may, in some embodiments, serve as a physical stop that prevents pawl 20 and/or flexure arm 30 from moving radially inward.

In some embodiments, the effect of a camming bollard 84 on a pawl 20 may be achieved purely through physical contact. However, if desired, in some embodiments a camming bollard and/or a pawl 20 may have a magnet installed therein. In such embodiments, a magnetic force (e.g. a repelling force) may provide at least some of the force by which the camming bollard acts to urge the pawl radially outward.

In at least some embodiments the one or more camming bollards 84 may be part of a load-bearing (force-transmitting) path between drum 80 and pawl-support plate 40. Thus, camming bollards 84 may be made of any suitable material, e.g. steel. In some embodiments the far end of each bollard (e.g., the far right end of bollards 84 as shown in FIG. 9) may be seated in a receptacle of drum 80, which receptacle may be reinforced to enhance the load-bearing and load-transmitting properties of the interface between the drum and the camming bollard. One such receptacle is visible, unnumbered, in the drum of FIG. 9. Of course, in some embodiments bollards 84 may serve purely for the purposes of camming as described earlier herein; if so, some other posts or similar features may be provided that serve as part of a load-bearing path between plate 40 and drum 80. Drum 80 may be made of any material that exhibits properties commensurate with the desired strength. In various embodiments, drum 80 may be made of a molded polymer such as e.g. glass-fiber-reinforced nylon; or, drum 80 may be made of a metal such as e.g. cast aluminum. Similarly, pawl-support plate 40 may be made of any material with suitable properties, e.g. steel.

In some embodiments the camming bollards may serve as physical stops that limit the rotation of drum 80 relative to pawl-support plate 40. That is, in some embodiments the rotation of drum 80 relative to plate 40 may be limited by the distance that camming bollard 84 can travel within the elongate length of slots 43 of plate 40, as is evident from inspection of FIGS. 11 and 12. That is, in some embodiments, the length of an elongate slot 43 of pawl-support plate 40, in combination with the presence of a bollard 84 that extends therethrough, can define the limits of the arc of rotation of pawl-support plate 40 relative to drum 80. In various embodiments, the length of an elongate slot 43 can be set so that this arc of rotation is at least 5, 10, 15, 20, or 25 degrees. In further embodiments, the length of elongate slot 43 can be set so that this arc of rotation is at most 80, 70, 60, 50 or 40 degrees. (The particular slots 43 depicted e.g. in FIG. 12 appear to establish an arc of rotation of approximately 35 degrees.)

The above disclosures illustrate how a single type of pawl may be configured so that it can be actuated by absolute velocity, and/or can be actuated by acceleration. In some embodiments, the actuation of a flexure-borne pawl 20 by acceleration, and by velocity, may be at least generally independent of each other. In other words, in some embodiments a pawl 20 may be actuated upon the rotational velocity of the pawl exceeding a certain threshold value, substantially regardless of the acceleration that exists when that threshold value of velocity is reached, and substantially regardless of the particular acceleration history that was experienced by the pawl in reaching that threshold value of velocity. Similarly, a pawl 20 may be actuated upon the acceleration of the pawl exceeding a certain threshold value, substantially regardless of the absolute value of the velocity that exists when that threshold value of acceleration is reached, and substantially regardless of what velocity may or may not have been experienced by the pawl prior to reaching that threshold value of acceleration. (By substantially regardless is meant that a parameter contributes less than 10% to the effect in question.) In such embodiments, the predetermined threshold values of velocity and acceleration may be set substantially independently of each other. This will have advantages that are readily appreciated by ordinary artisans. In some embodiments it may be advantageous that the acceleration serves to modulate the response to velocity, e.g. to lower the threshold value of velocity-actuation. This may be achieved for example if the movement of a flexure arm along a bollard with which the flexure arm is in contact, serves to change the velocity-response of the flexure arm, e.g. by changing the effective undamped length of the flexure arm.

The above explanations have been couched in terms of a pawl being responsive to "acceleration". In this regard it is noted that, strictly speaking, a body (e.g. a pawl 20) that is following an orbital path is continuously experiencing acceleration due to the change in the direction of motion. (In other words, velocity is a vector quantity, and any change in the magnitude or direction of the velocity, corresponds to acceleration.) Those of ordinary skill will appreciate that the term "acceleration" as used herein (e.g. with regard to an acceleration-actuated pawl) specifically denotes so-called tangential acceleration of a body that is following an orbital path. (Such tangential acceleration will be generally aligned with block arrow 29 as shown in FIG. 12.) In other words, the acceleration that causes actuation of a pawl 20 corresponds to a change in the magnitude of the velocity of a body along its orbital path. Acceleration that results merely from the body following an orbital path at constant velocity (i.e., centripetal acceleration) has little or no effect; the velocity of the body along this orbital path must change in order for acceleration-actuation of the type disclosed herein to occur.

The value of acceleration that causes a pawl 20 to be actuated can be set as desired. Such an acceleration threshold may be set to any suitable nominal value, e.g. 0.6 to 0.8 g. This is a nominal value that corresponds to the linear acceleration experienced by the extended portion of safety line 115 (and thus to a user connected thereto). This can be converted to an actual value of acceleration of pawl 20 in view of the specific design parameters of the fall-protection apparatus (e.g. the diameter of the drum from which the safety line is unwound, the diameter of the orbit of the pawl, and so on). This can be used to set particular parameters that ensure that pawl 20 is actuated at a rotational acceleration (specifically, a tangential acceleration) that corresponds to the desired threshold of acceleration experienced by the user.

Further details of the particular arrangements depicted in FIGS. 8-10 will now be described. As noted, in some embodiments a drum 80 may comprise a main section that includes one major sidewall, with another major sidewall 87 being a separately-made item that is then combined with the main section to provide drum 80 (and to establish a space 88 between the sidewalls, that accepts the wound-up length of safety line 115). As shown in FIG. 10, pawl-support plate 40 can comprise buttresses 60 that function in a similar manner as described earlier herein. Pawl-support module 51, including flexure arm anchors 50 and flexure arms 30, can be attached to plate 40 e.g. by fasteners 45. (In the depicted embodiment, pawl-support module 51 and flexure arms 30 are integral; however, pawls 20 are separately made and are attached to the leading ends of flexure arms 30.) Various aspects of the pawls, flexure arms, and so on (e.g. the amount of circumferential wrap and so on) of this design have already been discussed herein.

It will be appreciated that the arrangements disclosed herein can allow a flexure arm 30 to be configured (e.g. to have the desired flexibility/stiffness) to allow a pawl 20 to be actuated by a predetermined velocity, and/or by a predetermined acceleration. In particular, the providing of a buttress 60 to substantially free the flexure arm from having to bear a high load upon the pawl being engaged with a ratchet tooth, can enable the freedom to design the flexure arm to achieve both of these goals.

As mentioned earlier herein, some fall-protection apparatus are occasionally subjected to "lock-up" testing e.g. in which an operator pulls rapidly on the safety line 115 to ensure that the braking device properly engages to arrest the motion. At the end of such a test, the apparatus and braking device thereof should be able to return to their previous, disengaged-and-ready condition. In some embodiments a dedicated biasing mechanism may be provided that urges pawl-support plate 40 circumferentially forward (i.e., in a leading direction) relative to drum 80, so that plate 40 can be returned to its home/ready position at the conclusion of a lock-up test. However, in some embodiments it may not be necessary to provide plate 40 with a dedicated biasing mechanism. Rather, it has been found that in some embodiments a biasing member 86 (e.g. a torsion spring as discussed previously) that serves to bias drum 80 toward rotating in a direction that will retract safety line 115 onto the drum, may serve this purpose. Such biasing members are conventionally configured to retract line 115 (and thus to remove any slack in line 115) if the user moves toward the apparatus. However, if pawl-support plate 40 and drum 80 are configured to exhibit freedom of relative rotation in the general manner described above, this biasing of drum 80 may be sufficient to serve the purpose of restoring pawl-support plate 40 to its home position after a lock-up test. Thus in at least some embodiments, such a biasing member of drum 80 may perform "double-duty" and eliminate any need to provide a dedicated biasing mechanism for pawl-support plate 40. However, in some embodiments a dedicated biasing mechanism may be provided for pawl-support plate 40, e.g. to bias plate 40 relative to drum 80. Various mechanisms and arrangements by which a pawl-support plate may be biased relative to a drum are described in detail in U.S. Provisional Patent Application No. 62/705,535, filed Jul. 2, 2020, entitled Fall-Protection Apparatus Comprising Braking Device With Velocity-Actuated, Acceleration-Modulated Pawl(s), which is incorporated by reference herein in its entirety.

The above discussions have described the use of acceleration-actuated pawls as an adjunct to a braking system that relies on velocity-actuated pawls that are flexure-borne pawls. However, it is noted that the concept of an acceleration-actuated pawl as achieved e.g. by a camming system as disclosed herein, is independent of any requirement that the pawl must be flexure-borne. Rather, based on the disclosures herein, an ordinary artisan will appreciate that a system of camming bollards or like mechanisms, could be applied to pivot-mounted pawls of the general type described earlier here. Such pawls can thus pivot into an engaged position upon exceeding a predetermined threshold of velocity; and/or, such pawls could be motivated to pivot into an engaged position by way of the pawl impinging onto a camming bollard of the general type described above, as the result of sufficient acceleration.

In general, in some embodiments (regardless of the particular type of pawl) a camming system as described above may be used to provide an acceleration-actuated braking system. That is, in some embodiments the pawls and associated components may be configured so that they are far more likely to be actuated by acceleration than by absolute velocity. Thus, an acceleration-actuated braking device that relies on a camming system as described herein may be used without regard to whether the braking device is able to be velocity-actuated. Such arrangements and uses are within the scope of the disclosures herein.

As noted, the arrangements herein cause at least one pawl to engage with a tooth 91 of a ratchet 90 as indicated in exemplary embodiment in FIG. 7. This can either stop the rotation of drum 80 directly (e.g. in the case of a "hard-stop" arrangement as mentioned earlier herein), or can activate a friction brake that brings the rotation of drum 80 to a halt. It will be appreciated that numerous variations of ratchets, and the manner in which one or more pawls engage with a tooth of the ratchet, are possible. Typically, any such pawl will be configured so that the engaging end 22 of a pawl 20 (in fact, the entirety of the pawl 20) will travel from a disengaged position to an engaged position by moving generally radially outward. Such arrangements are typically used with a radially-inward-facing ratchet (meaning a ratchet, e.g. a ratchet ring or partial ring, with radially inward-facing teeth).

In some embodiments a ratchet, rather than being provided e.g. as a toothed ring that is made separately and inserted into a housing of a fall-protection apparatus, may be provided e.g. as an integral (e.g. molded, cast, or machined) feature of the housing of the apparatus. The PROTECTA fall-protection apparatus, available from 3M Fall Protection, Red Wing, MN, and discussed in more detail below, is an example of a product that uses this type of ratchet. Another possible variation in ratchet design is presented in U.S. Pat. No. 9,488,235, in which a ratchet takes the form of a single tooth ("stop member") that is provided as an integral part of a bracket (e.g., a load-bearing bracket) of a fall-protection apparatus. (The PROTECTA product, and the apparatus described in the '235 patent, rely on a completely different arrangement of pawls than disclosed herein; these items are cited merely to illustrate potential variations in ratchets.) In fact, the ratchet 90 depicted in FIGS. 11 and 12 herein is another example of a ratchet that comprises only a single tooth 91, as is clear from FIGS. 11 and 12.

From the above discussions it will be clear that a ratchet of a rotationally-activated braking device can be any component (e.g. a toothed ring, a partial ring, or a portion of a fall-protection bracket or housing, and so on) that presents at least one tooth that can be engaged by an engaging end of a pawl to initiate a braking operation of the rotationally-activated braking device. It is emphasized that the term "ratchet" is used for convenience of description; use of this term does not require that the ratchet and pawl(s) must necessarily be arranged e.g. so that relative rotation of these components is permitted in one direction but is precluded in the opposite direction. (However, the ratchet and pawl(s) can be arranged so that such functionality is provided if desired.)

In some embodiments a rotationally-activated braking device as disclosed herein can bring a drum to a "hard stop" (e.g. the braking device may rely on a ratchet that is non-rotatably fixed to the housing of the apparatus), as discussed earlier herein. However, in other embodiments a rotationally-activated braking device as disclosed herein will comprise (e.g. will work in concert with) a friction brake. In general, a friction brake will comprise at least one layer of friction material and at least one rotatable member, with a friction-braking surface of the layer of friction material being in contact (typically, at all times during ordinary use of the fall-protection apparatus) with a contact surface of the rotatable member. By a rotatable member is meant an item (e.g., a disk, ring, rotor, or the like) that is configured so that the member and the layer of friction material can be set into rotating motion relative to each other upon sufficient differential torque being applied to the layer of friction material and the rotatable member as the result of the engaging of a pawl with a ratchet of the rotationally-activated braking device. In many embodiments, the friction-braking surface of the layer of friction-braking material and the contact surface of the rotatable member are constantly pressed together to provide sufficient static frictional force that, as a human user moves about a workplace in ordinary use of the apparatus, there is no relative motion between the two surfaces. However, upon the engaging of a pawl with a ratchet of the rotationally-activated braking device, sufficient differential torque is generated to overcome the static frictional force, such that relative motion of the two surfaces (and hence relative motion of the rotatable member and the layer of friction material) may occur. The rotatable member and the layer of friction material are configured so that this relative rotation of the layer of friction material and the rotatable member will be slowed and/or brought to a halt by the frictional forces between the friction-braking surface of the layer of friction material and the contact surface of the rotatable member. The slowing of this relative rotation will serve to slow (e.g. halt) the rotation of a drum bearing a safety line.

Figure 13:
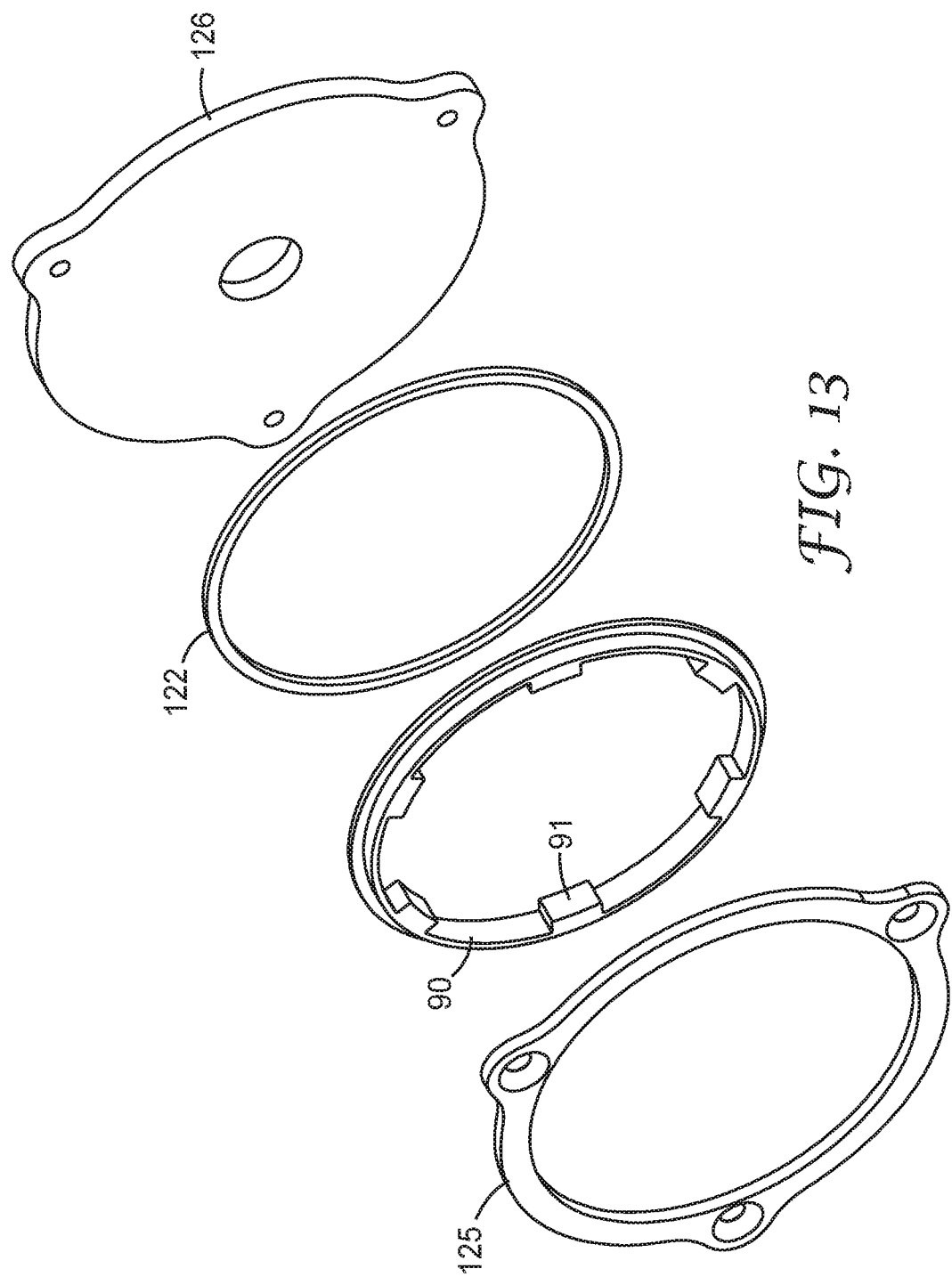
FIG. 13 is a perspective exploded view of an exemplary friction brake.

The above is a general description of a friction brake and its function; many variations are possible. In some embodiments, it may be convenient for a ratchet of the rotationally-activated braking device to serve as a rotatable member of the friction brake of the braking device. In many such designs, the ratchet is able to rotate with respect to the housing of the apparatus, but typically remains stationary during ordinary use of the apparatus. That is, the drum may rotate (relatively slowly) relative to the housing to extend and retract the safety line as a human user moves about a workplace. However, the ratchet, not being subjected to any rotational force, and being frictionally constrained by one or more layers of friction material, does not rotate relative to the housing. In the event that the drum begins to rotate rapidly e.g. due to a fall, the engaging end of a pawl engages with a tooth of the ratchet and overcomes this frictional constraint and causes the ratchet to rotate relative to the layer(s) of friction material and thus relative to the housing of the apparatus. The friction between the friction-braking surface of the friction material and the contact surface of the ratchet then slows or halts the rotation of the ratchet relative to the housing of the apparatus thus slowing or halting the rotating of the rotatable drum relative to the housing of the apparatus. The assembly shown in exploded view in FIG. 13 is one example of this general type of friction brake. Such an assembly may rely on a ratchet 90 that, along with a layer of friction material 122, is sandwiched between a pressurization ring 125 and a backing plate 126. Ring 125 and plate 126 may be pressed together (e.g. by way of bolts that pass through the various orifices visible in FIG. 13) with a desired force that imparts the desired frictional characteristics. It will be appreciated that the items of FIG. 13 are merely one way of achieving such functionality; various modifications are possible (for example, rather than pressurization ring 125 and/or backing plate 126 being a separately-made item that is installed into a housing of a fall-protection apparatus, a portion of the housing itself may serve such a role). Many arrangements of friction brakes are possible. For example, in some embodiments a ratchet may comprise two contact surfaces and may be sandwiched between two layers of friction material. In other embodiments, a ratchet of a friction brake may only comprise a single contact surface which may be in contact with only a single layer of friction material.

In some embodiments, the rotatable member of a friction brake of a rotationally-activated braking device may not necessarily be a ratchet of the braking device. Rather, in some cases the ratchet of the rotationally-activated braking device and the rotatable member of the friction brake of the rotationally-activated braking device may be separate items. In one exemplary arrangement of this general type, a pawl-support plate 40 may serve as a rotatable member of the friction brake. For example, a layer of friction material 122 may be arranged in between the pawl-support plate 40 and drum 80, with a first major frictional surface 123 of friction material 122 in contact with a contact surface 42 of plate 40 as indicated in FIGS. 2 and 3 herein. A second major frictional surface 124 of friction material 122 may similarly be in contact with a contact surface of drum 80. The entire assembly can be pressed together to impart the desired frictional characteristics between these surfaces. (It will be appreciated that such an arrangement would not likely be used in embodiments in which drum 80 and pawl-support plate 40 are desired to have freedom of relative rotation, e.g. in the event that camming-derived acceleration-actuation is desired.)

With such an arrangement, the engaging of an engaging end of a pawl with a tooth of the ratchet will cause the pawl-support plate 40 on which the pawl is mounted to near-instantaneously cease rotating, while drum 80 may continue to rotate momentarily. The frictional force between the contact surface of rotatable member (pawl-support plate) 40 and the first friction-braking surface of the layer of friction material 122, and/or between the contact surface of the drum and the second friction-braking surface of the layer of friction material, will slow or halt the rotation of the drum. Often, the drum may be brought to a halt before the drum has completed, for example, one full revolution. (In some embodiments of this general type, the layer of friction material may be e.g. fixedly attached to the drum or to the pawl plate, so that the frictional interaction only occurs at one interface rather than at two interfaces.) The arrangement shown in FIG. 2 herein is an example of this general approach. Various products available from 3M Fall Protection, Red Wing, MN, under the trade designation PROTECTA provide further examples of fall-protection products of this general type.

It will be appreciated that many variations of the above-presented exemplary arrangements may be employed. For example, a separate plate, e.g. attached to the drum or co-mounted on a common shaft so that the separate plate is not rotatable relative to the drum, may provide a contact surface for a layer of friction material, rather than having the friction material directly in contact with a wall of the drum. In some embodiments a layer of friction material may itself be disposed on (e.g. laminated or bonded to) a support plate as discussed herein. In other embodiments, a layer of friction material may be "free-standing" rather than being bonded to a support plate. Any suitable friction material may be used, e.g. cork, rubber, and so on. Friction materials that may be particularly useful are described in U.S. patent application Ser. No. 16/630,584 and in corresponding PCT Published Application WO2019/012454, both of which are incorporated by reference herein in their entirety. The above discussions make it clear that any compatible type, design or arrangement of ratchet, friction material, and so on, may be used in combination with the herein-disclosed arrangement of pawls.

Figure 14:
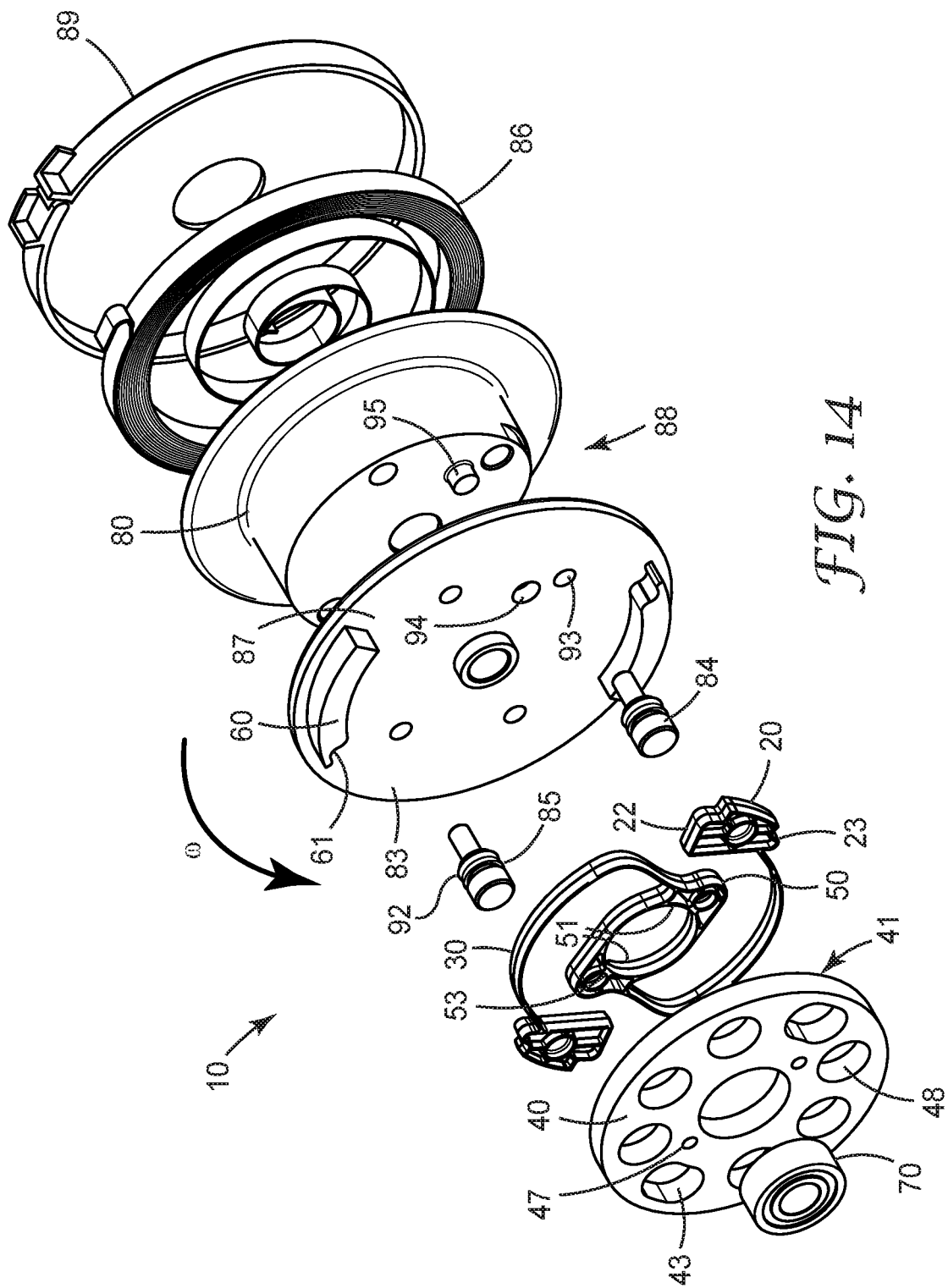
FIG. 14 is a perspective exploded view of various components of another exemplary fall-protection apparatus.
Figure 15:
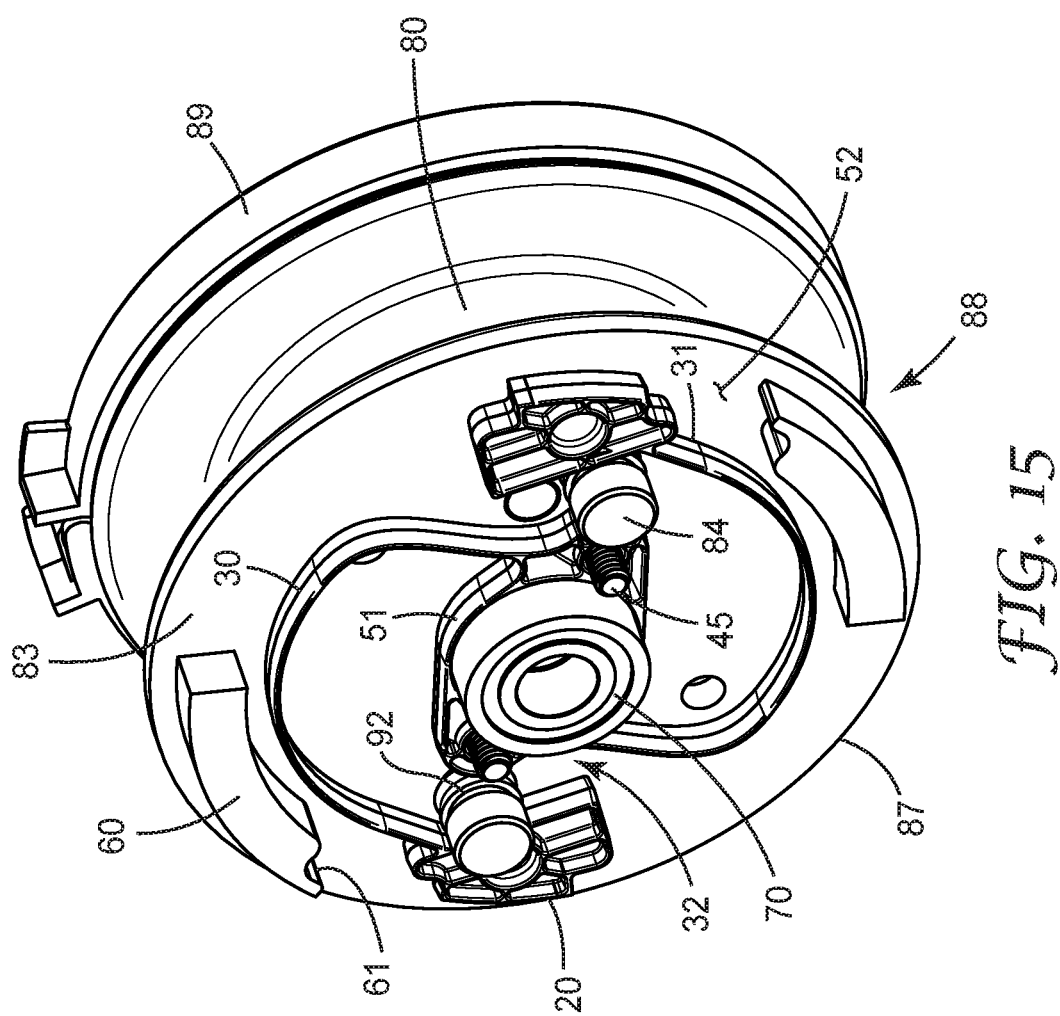
FIG. 15 is an unexploded perspective view of various components of FIG. 14.

Other exemplary designs that illustrate various further variations and modifications of the herein-disclosed concepts are depicted in FIGS. 14-15. FIG. 14 depicts, in exploded view, an exemplary arrangement of a fall protection apparatus (a self-retracting lifeline) that is somewhat similar to that depicted in FIG. 2, with differences as noted below. FIG. 15 is a nonexploded perspective view of the apparatus of FIG. 14 with the pawl-support plate (40) omitted so that other items can be seen. FIGS. 14 and 15 show various components of the apparatus, with some entities, e.g. housing pieces and various ancillary items, being omitted for clarity. In particular, a ratchet is not depicted in FIG. 14 or 15; any suitable rachet may be used, e.g. of the type depicted in FIG. 2. Similarly, a suitable friction material may be included if desired.

In similar manner to the design of FIG. 2, the design of FIGS. 14 and 15 comprises a rotationally-activated braking device 10 along with a drum 80 and a torsion spring 86 of the general type described earlier herein (as well as a cap 89 for the torsion spring). Rotationally-activated braking device 10 comprises pawls 20, flexure arms 30, a pawl-support module 51, and a pawl-support plate 40 to which the pawl-support module 51 is fixedly attached. This attachment can be achieved by passing any suitable fasteners, e.g. screws or bolts, through orifices 53 of pawl-support module 51 and corresponding, aligned orifices 47 of pawl-support plate 40. (No fasteners are shown in FIG. 14 but are visible in FIG. 15 in the form of screws 45, noting again that the pawl-support plate (40) to which the screws are attached is omitted from FIG. 15.)

In the design of FIGS. 14-15 the previously-described buttresses 60 are located on sidewall 87 of drum 80 rather than on pawl-support plate 40 as was the case in the design of FIG. 2. By definition, a buttress that is located on a drum sidewall cannot move relative to the sidewall, and the drum sidewall cannot rotate relative to the remainder (other components) of the drum. Such a buttress may be e.g. integrally molded with sidewall 87 or may be made separately and then attached to sidewall 87. In turn, in some embodiments sidewall 87 may be formed (e.g. molded) as an integral portion of drum 80. In other embodiments sidewall 87 may be a separately-made piece that is e.g. mounted on a common shaft (not shown in FIG. 14) with the other components of drum 80. Such a sidewall 87 may be fixed in position relative to the other components of drum 80 e.g. by providing sidewall 87 with a mating feature (e.g. an orifice 94 or a post) that is mated to a complementary mating feature (e.g. a post 95 or an orifice) of a main portion of drum 80 as evident in FIG. 14. And/or, sidewall 87 and the other components of drum 80 may be mounted on a common shaft in such manner as they cannot rotate relative to each other. In some embodiments, such a sidewall 87 may be physically attached (e.g. bolted) to another component of drum 80; in other embodiments, sidewall 87 may not necessarily be attached in this manner but nevertheless will be configured so that sidewall 87 cannot rotate relative to the remainder of drum 80.

Regardless of the particular manner in which this is achieved, sidewall 87 of drum 80 will not be rotatable relative to drum 80. Buttresses 60, being on sidewall 87, will thus be in a fixed position relative to drum 80, rather than being on a pawl-support plate 40 that is capable of rotating at least to a certain extent relative to drum 80 as in the design of FIG. 2. Although either arrangement may be preferable in various circumstances, a design in which the buttresses are on the drum sidewall may offer advantages at least in some instances.

For example, positioning buttresses 60 on the sidewall of the drum upon which the safety line 115 of the fall-protection apparatus is wound can provide that the forces that are developed when a pawl 20 engages with a ratchet tooth (not shown in FIG. 14) are transmitted through a buttress 60 into drum 80 rather than into a pawl-support plate 40 as in the previously-described designs. This can, in the event of a user fall, minimize any fall-arrest force that is transmitted through pawl-support plate 40 into a bearing 70 upon which pawl-support plate 40 rotates. This reduction in the need for bearing 70 to withstand heavy loads can allow the design of bearing 70 to be simplified (e.g., so as to be a simple sleeve or bushing as illustrated in FIG. 14) and/or to be configured for optimum performance of the braking device under particular conditions.

It will be appreciated that the presently-described design, in which pawl-support plate 40 and drum sidewall 87 are separate items (with buttresses on the drum sidewall), differs from the arrangement mentioned earlier herein in which a drum sidewall itself could serve as a pawl-support plate (and could have buttresses thereon). In the present case, the buttresses are mounted on a drum sidewall 40 that, by definition, is not acting as a pawl-support plate, that function being served by a separate pawl-support plate 40.

The design of FIGS. 14-15 differs from that of FIG. 2 in another aspect. In the previous design, with buttresses 60 located on a pawl-support plate 40 to which pawl-support module 51 (or, a collection of independent flexure arm anchors 50) is fixedly attached, there is no possibility of centrifugal movement of the buttresses relative to the pawls. That is, in the previous design, a pawl can move generally radially outward from a disengaged position to an engaged position as illustrated in FIGS. 4 and 5 (noting that the path followed by the pawls, although at least generally radially outward, may include a small circumferential aspect). During this process, the buttresses will remain in a fixed circumferential position relative to the flexure arm anchors 50 and thus to the path of the pawl. Such an arrangement may require the pawls and flexure arms to be configured so that when a pawl moves radially outward to an engaged position (as illustrated by block arrow 28 of FIG. 4), the trailing end of the pawl will be positioned closely in front of (i.e. in a "leading" direction) the leading end of the buttress. This minimizes any circumferential gap 52 between the trailing end of the pawl and the leading end of the buttress so that when the pawl engages a ratchet tooth, the trailing end of the pawl can be "jammed" into the leading end of the buttress (as illustrated by block arrow 29 of FIG. 5) without the flexure arm of the pawl being subjected to unacceptably large forces, as discussed earlier herein. Such arrangements may necessitate fairly tight geometric and dimensional tolerances between the positions of the pawls and the buttresses.

In contrast, the locating of buttresses 60 on sidewall 87 of drum 80 as in FIGS. 14-15 has the effect that upon the occurrence of the above-described "lagging" of pawl-support plate 40 and pawls 20 relative to sidewall 87, the buttresses will circumferentially move relative to the pawls, in a "leading" direction. (Strictly speaking, drum 80 and buttresses 60 thereon, and pawl-support plate 40 and pawls 20 thereon, are all moving in the ω direction in terms of absolute motion, but the mass of the latter components provides that these components can momentarily "lag" the former components in their rate of motion.) A buttress can thus move circumferentially "forward" toward an optimal position for receiving an engaged pawl (i.e., can reduce circumferential gap 52 so that the engaged pawl can be "jammed" against the buttress with minimum force on the pawl's flexure arm), even as the pawl is moving radially outward toward an engaged position.

The providing of buttresses that are able to move relative to pawls in this manner can provide that under conditions of normal use (e.g. in the absence of a fall event), a drum-mounted buttress 60 can remain positioned circumferentially rearward (i.e., in the "trailing" direction) of a pawl 20 by a relatively large distance, since the buttress will be able to move relative to the pawl to close this distance in the case of a fall event. The effect of this is that the pawls, buttresses, and so on, may be designed without necessarily requiring extremely tight tolerances between the pawls and the buttresses under conditions of normal use. Thus in the exemplary depiction of FIG. 15, the circumferential gap 52 between the trailing end of a pawl and the leading end of a buttress is considerably greater than the circumferential gaps 52 depicted in the arrangements of FIGS. 4 and 11, which utilize buttresses that are located on the pawl-support plate. In various embodiments, a centrifugal gap may have a maximum dimension (measured along a circumferential path at the point of closest approach between a pawl and a buttress, with these items in their disengaged positions) of at most 10, 8, 6, 4, or 2 mm. In further embodiments, such a centrifugal gap may have a minimum dimension of at least 1, 3, 5, or 7 mm. Such a centrifugal gap will typically exhibit its maximum value when pawl-support plate 40 is in its previously-described "home" position relative to drum 80. Movement of pawl-support plate 40 along its arc of partial rotation away from this home position will cause the centrifugal gap to be reduced as described above. (FIGS. 15 and 16 both depict apparatus in which the pawl-support plate 40 is in its home position.) In various embodiments, this rotational movement of plate 40 may reduce the circumferential gap by a factor of at least 10, 20, 30, 40, 50, 60, 70, 80, or 90%. The reduction factor will be assessed using the original, maximal value of the gap. Thus if such a gap is 4 mm when the pawl-support plate is in the home position and is 1 mm after rotational movement of the pawl-support plate relative to the drum, the reduction factor will be (4-1)/4 or 75%.

Even in a possible instance in which a buttress has not moved fully circumferentially forward into position for receiving a pawl by the time the pawl engages a ratchet tooth, the circumferential relative motion that is permitted between the buttresses and the pawls can allow that, when the pawl does engage a ratchet tooth, any remaining circumferential gap can be closed by this relative motion of buttress and pawl (e.g., without the flexure arm of the pawl being subjected to large forces). In other words, in some instances at least a portion of a circumferential gap between a pawl-support-plate-mounted pawl and a drum-mounted buttress may be closed by deceleration of the pawl-support plate relative to the drum, rather than by acceleration of the drum relative to the pawl-support plate.

It is further noted that the circumferential relative motion that is permitted between the buttresses and the pawls may advantageously enhance the ability of the pawls and buttresses to be separated from each other (and for the pawl to be disengaged from a ratchet tooth) at the conclusion of a "lock-up" test of the type described earlier herein.

A drum sidewall 87 that bears one or more buttresses 60 thereon can be of any suitable design and can be arranged in any suitable manner. In particular a "sidewall" 87 does not necessarily have to define, or exhibit, an axially-inward surface that defines an axial boundary of space 88 into which a safety cable is wound. Rather, in some embodiments a sidewall 87 may be a separately-made item that is e.g. attached (e.g. bolted, screwed, etc.) to a flange of a two-flanged drum of the general type exemplified by drum 80 of FIG. 2. In such a case a flange of the drum may provide the axially-inward surface that defines space 88; however, an entity that comprises one or more buttresses and is attached to such a flange (or, is keyed to a common shaft so as to exhibit a fixed relationship to the drum, even if not directly attached to a flange of the drum) so that the entity is fixed to the drum as a whole, will be considered to be a "sidewall" as used herein.

Based on the discussions herein it will be appreciated that in various embodiments as disclosed herein, a buttress 60 may be located on a pawl-support plate 40 or a drum sidewall 87. Either configuration may be preferable under various circumstances. In some embodiments, a hybrid arrangement may be used with at least one buttress being on a pawl-support plate and with at least one buttress being on a drum sidewall. For example, a "primary" buttress may be on a drum sidewall and a "secondary" buttress may be on a pawl-support plate (or vice-versa). It is further noted that any such buttresses may be positioned on a pawl-support plate and/or on a drum sidewall, when used with either of the previously-discussed forwardly-wrapped or rearwardly-wrapped pawl and flexure arm configurations.

The exemplary arrangements shown in FIGS. 14 and 15 differ from the design of FIGS. 2 and 3 in another aspect. In the design of FIGS. 2 and 3, pawls 20, as well as flexure arms 30, flexure-arm anchors 50, and pawl-support module 51, are positioned axially outwardly from pawl-support plate 40. By this is meant that pawls 20 and associated arms 30, anchors 50, and module 51, are positioned further away from drum 80 than is pawl-support plate 40, along the axial direction of the apparatus. (This definition is with reference to the main body of support plate 40, irrespective of how far any buttresses may extend axially outward from the main body of plate 40.) In contrast, in the design of FIGS. 14 and 15, pawls 20, flexure arms 30, flexure-arm anchors 50, and pawl-support module 51 are positioned axially inwardly of pawl-support plate 40. In other words, in this design, pawls 20 etc. are axially "sandwiched" between pawl-support plate 40 and sidewall 87 of drum 80 (noting that in FIG. 15, pawl-support plate 40 is omitted so that other items can be seen). Such a design may facilitate the use of buttresses 60 that are located on a drum sidewall 87 rather than on a pawl-support plate 40 (however, such a design is not the only way that an apparatus can be configured to allow buttresses 60 to be located on a drum sidewall 87 rather than on a pawl-support plate 40, as discussed later with regard to FIGS. 16 and 17).

In other aspects, a pawl-support plate 40 as depicted in FIGS. 14 and 15 will function in substantially similar manner as discussed previously herein. The rotational inertia of support plate 40 (which will include contributions from pawl-support module 51, flexure arms 30 and pawls 20) will, upon rapidly-increasing rotation of drum 80, provoke the previously-described rotational "lagging" that causes bollards 84 to move relative to support plate 40 and pawls 20 (with openings, e.g. elongated slots 43, being provided in plate 40 to allow this) thus causing the previously-described camming action.

In FIG. 14, additional openings 48 (that do not receive a bollard 84) in pawl-support plate 40 are visible; such features can be included e.g. in order to tailor the rotational inertia of support plate 40 as desired. It will be appreciated that any such features (whether through-openings or dead-end cavities, and of any suitable shape, aspect ratio, etc.), as well as other design parameters (e.g. the average and/or local thickness of support plate 40) can be manipulated in order to achieve the desired rotational inertia. The rotational inertia being affected by mass in combination with distance from the axis of rotation, the overall mass of support plate 40 and associated items, and/or the spatial distribution of such mass, can be configured to provide the desired performance. In particular embodiments, a pawl-support plate may be configured to have as much mass as far from the axis of rotation as possible, in order to obtain the highest rotational inertia for the minimum total mass. Thus for example, a significant amount of the mass of a pawl support plate may be located e.g. along the radially outer perimeter of the pawl-support plate.

Another feature of the design depicted in FIGS. 14 and 15 is that camming bollards 84 are in the form of members (e.g., metal members with a small-diameter end configured to fit into an aperture 93 of drum sidewall 87 and with an opposing, large-diameter end) with a bushing 92 mounted thereon. As evident from FIGS. 14 and 15, in some embodiments a sidewall of such a bushing 92 can provide the contact surface 85 of bollard 84 that impinges on a contact surface 27 of a pawl 20, and/or a surface of a flexure arm 30, to cause the camming action. Such a bushing may be made of, e.g., a low-friction material such as poly(oxymethylene) (e.g. DELRIN) or the like. (Similarly, a previously-discussed sleeve bearing 70 may be made of a low-friction material; or, the bearing may be e.g. a roller bearing.) In terms of minimizing other potential frictional interactions, in some embodiments pawls 20 may be positioned between major surface 41 of pawl-support plate 40 and major surface 83 of drum sidewall 87 so that pawls 20 have little or no contact with these surfaces. In some embodiments, such surfaces (and/or the surfaces of pawls that face them) may comprise low-friction materials (e.g. provided by a low-friction coating or treatment) to further minimize any chance of the pawls being affected by frictional interaction. In some particular embodiments, making pawls 20, flexure arms 30, and/or pawl-support module 51 of amorphous metals as mentioned earlier herein may be beneficial in that such materials may exhibit low friction and high resistance to galling.

Figure 16:
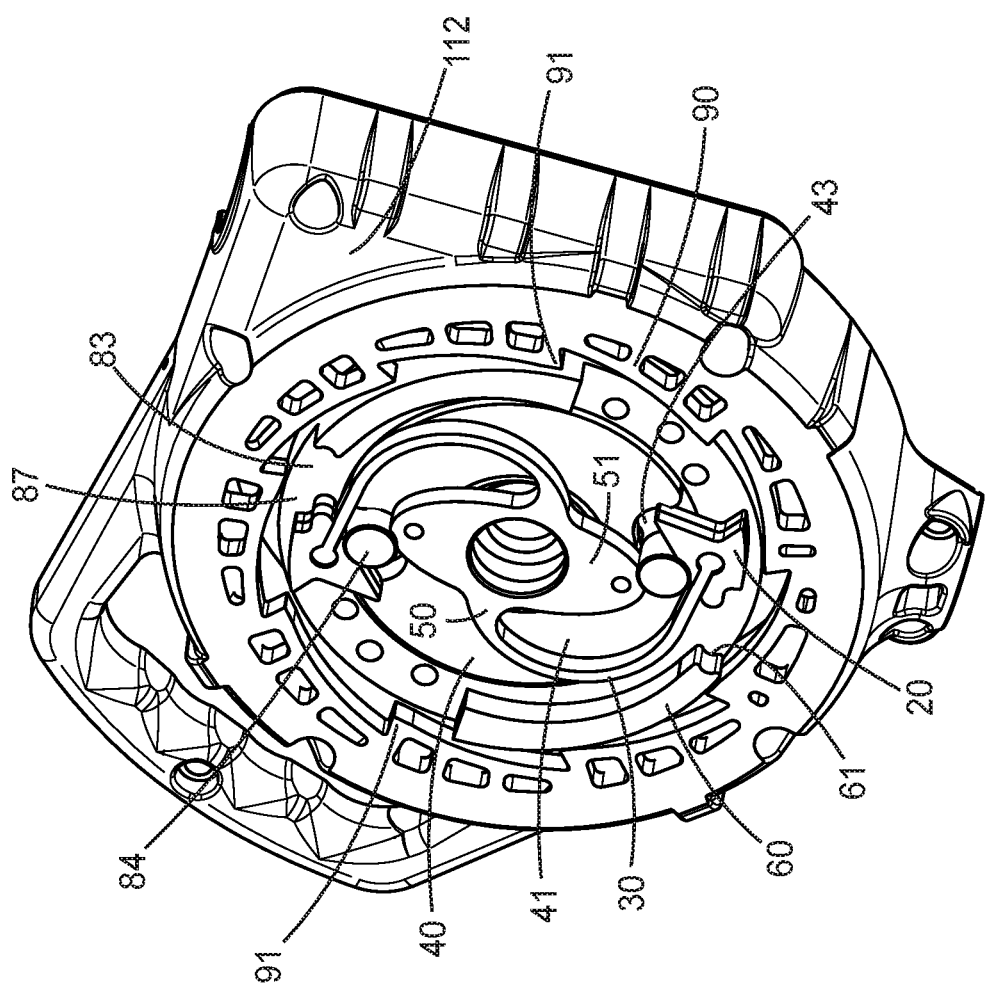
FIG. 16 is a perspective view of various components of another exemplary fall-protection apparatus.
Figure 17:
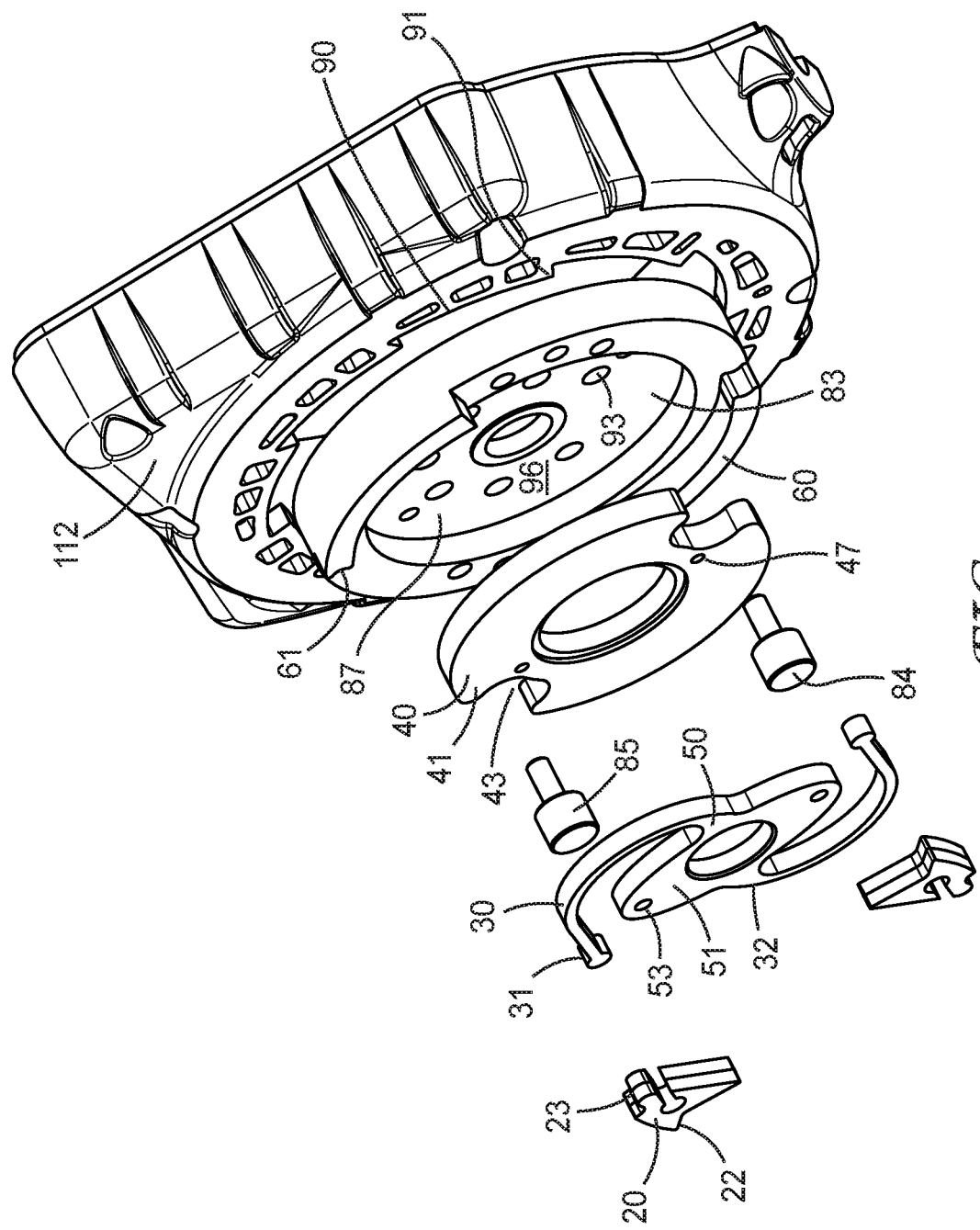
FIG. 17 is a perspective exploded view of various components of FIG. 16.

Other exemplary designs that illustrate various further variations and modifications of the herein-disclosed concepts are depicted in FIGS. 16 and 17. These Figures respectively depict a sectional view and an exploded sectional view of portions of an exemplary fall protection apparatus (e.g. a self-retracting lifeline) comprising a rotationally-activated friction brake. As usual, not all components of the apparatus are shown, so that items of interest can be more easily seen. (Also, FIGS. 16 and 17 are partial sectional cutaway views with an axially outer portion of housing piece 112 omitted so that pawls 20 and so on can be seen; in actuality, housing piece 112 may look very similar to piece 112 as shown in FIG. 2.)

In the exemplary arrangement depicted in FIGS. 16 and 17, buttresses 60 are located on (e.g., are integral extensions of) drum sidewall 87, in generally similar manner as in FIGS. 14 and 15. However, in the design of FIGS. 16 and 17, pawls 20, flexure arms 30 and pawl-support module 51 are not axially inward of pawl-support plate 40 as in the design of FIGS. 14 and 15. Rather, in the design of FIGS. 16 and 17 the pawls, flexure arms and pawl-support module 51 are axially outward of pawl-support plate 40, in generally similar manner to the previously-discussed designs shown in FIGS. 2-3 and 8-10. To facilitate the functioning of such an arrangement, the axial "height" of buttresses 60 can be greater than the axial "thickness" of support plate 40 so that buttresses 60 extend axially past support plate 40 far enough to allow pawls 20 to interact with buttresses 60 in the manner previously described. To further facilitate this, the outer diameter of pawl-support plate 40 can be smaller than the inner diameter defined by the radially-inward surfaces of buttresses 60. This allows pawl-support plate 40 to fit within an axially-outwardly-open-ended receptacle 96 of drum sidewall 87 as indicated in FIG. 17, with portions of the radially outward perimeter of plate 40 being concentrically bounded by buttresses 60. In some embodiments drum sidewall 87 may comprise an axially-extending circumferential collar 97 that further establishes receptacle 96 (e.g. so that the entire perimeter of plate 40 is circumferentially bounded by portions of sidewall 87).

Such arrangements can allow the previously-described velocity-actuation and/or acceleration-actuation (e.g., the camming action as described earlier herein) to occur, with a pawl 20 being able to move outward to an engaged position and encounter a tooth 91 of a ratchet 90, to then be jammed against a buttress 60, and so on, so as to achieve the desired rotationally-activated braking. Many components and features of the apparatus of FIGS. 16 and 17 are similar in function (although differing e.g. in size, shape, etc.) to the similarly-numbered items described previously herein, and will not be discussed in detail at this point.

However a few particular features of this design may be noted. The design of FIGS. 16 and 17 is one in which a ratchet 90 takes the form of a set of teeth 91 that are integrally molded into housing piece 112 (in contrast to e.g. a separately-made ratchet ring of the type shown in FIG. 13). In this design, bollards 84 (which, in this design, do not having bushings) each comprise an end that resides in an aperture 93 of drum sidewall 87 so that bollards 84 are fixed in place relative to drum 80. In this design, the "slots" 43 that allow bollards 84 to move circumferentially relative to pawl-support plate 40 are in the form of radially-outwardly-open-ended "notches" rather than as orifices that are bounded on all sides by portions of pawl-support plate 40. In this design, the pawls 20 (which may be made of any suitable metal, e.g. steel) are made separately from pawl-support module 51 and flexure arms 30 (which may be e.g. molded of any suitable material, e.g. an amorphous metal or an engineering thermoplastic).

It will thus be appreciated that in various embodiments, a buttress 60 may be positioned on (e.g., may be affixed to, may be an integral part of, etc.) a pawl-support plate 40 or a drum sidewall 87. Furthermore, pawls 20, flexure arms 30, and flexure arm anchors 50 (as well as a pawl-support module 51 that integrally includes anchors 50, if such a module is present) may be positioned outward of the pawl-support plate 40 that supports them, or may be positioned axially inward of the pawl-support plate 40 that supports them. Any combination of these choices may be used and is within the scope of the disclosures herein. This includes combinations not explicitly shown in the Figures herein (e.g., a design in which the buttresses are on a pawl-support plate that is located axially outward of the pawls, flexure arms, and flexure arm anchors).

The arrangements disclosed herein may be advantageously used in any fall-protection apparatus; in particular, in a self-retracting lifeline. In addition to the documents previously cited herein, fall-protection apparatus such as e.g. self-retracting lifelines in which the arrangements disclosed herein may be advantageously utilized, are described in U.S. Pat. Nos. 8,181,744, 8,256,574, 8,430,206, 8,430,207, 8,511,434, and 9,488,235, and in U.S. Published Patent Application 2016/0096048.

In some embodiments the fall-protection apparatus is a self-retracting lifeline which meets the requirements of ANSI Z359.14-2014. In general, the arrangements disclosed herein may be used in any fall-protection apparatus in which there is a desire to enhance the performance of the product, e.g. by minimizing the occurrence of nuisance lockups that may occur during movements about the workplace, while ensuring that the braking device responds as quickly as possible in the event of an actual fall.

A fall-protection apparatus as described herein may comprise a housing, drum, rotationally-activated braking device, etc., of any desired size. In some embodiments, the apparatus may be sized so that it can serve as a so-called "personal" self-retracting lifeline as discussed later herein. The size of the rotationally-activated braking device may be characterized e.g. in terms of the diameter of the orbital pathway 25 that is followed by pawl(s) 20. In various embodiments, the diameter of orbital path 25 may be at least 20, 30, 40, or 50 mm; in further embodiments, the diameter of orbital path 25 may be at most 150, 120, 90, or 60 mm.

In various embodiments, a fall-protection apparatus as described herein may be used in concert with, or as part of, any suitable fall-protection system such as e.g. a horizontal lifeline or retractable horizontal lifeline, a positioning lanyard, a shock-absorbing lanyard, a rope adjuster or rope grab, a vertical safety system (such as e.g. a flexible cable, rigid rail, climb assist, or fixed ladder safety system), a confined-space rescue system or hoist system, and so on. In some embodiments a fall-protection apparatus as disclosed herein may comprise a housing configured so that the interior of the apparatus is at least partially sealed (such as in the product line available from 3M Fall Protection under the trade designation (SEALED-BLOK) e.g. for use in harsh or marine environments. In some cases a fall-protection apparatus as disclosed herein may be suited for use in so-called "leading edge" workplace environments. It is still further noted that the discussions herein have primarily concerned apparatus (e.g. self-retracting lifelines) that comprise a housing that is e.g. mounted to an overhead anchorage and that comprises a safety line with a distal end that can be attached to a harness of a human user. It will be understood that the arrangements disclosed herein may also be used in e.g. "personal" self-retracting lifelines that comprise a housing that is mountable to a harness of a human user and that comprises a safety line with a distal end that can be attached e.g. to an overhead anchorage. Such apparatus are exemplified by the product line available from 3M Fall Protection under the trade designations TALON and NANO.

It will be understood that any such fall-protection apparatus may include, or be used with, various ancillary items which are not described in detail herein. Such items may include, but are not limited to, one or more of lanyards, shock absorbers, tear strips, harnesses, belts, straps, paddings, tool holsters or pouches, impact indicators, carabiners, D-rings, anchorage connectors, and the like. Many such apparatus, products, and components are described in detail e.g. in the 3M DBI-SALA Full-Line Catalog (Fall 2016). Although in many embodiments it may not be necessary due to the presence of the friction brake, in some embodiments the safety line of the apparatus may comprise an in-line shock absorber e.g. of the type described earlier herein. (An exemplary shock absorber is depicted in FIG. 1 of the previously-mentioned U.S. Pat. No. 9,488,235 patent, which is incorporated by reference in its entirety herein.) In other embodiments, no such shock absorber will be present. It will be understood that a fall-protection apparatus that is "non-motorized" as defined and described earlier herein, may still include such items as one or more electrically-powered sensors, monitors, communication units, actuators, and the like. Although discussions previously herein have primarily concerned products that completely arrest (stop) the motion of a human user, it is stipulated that in some embodiments, a fall-protection apparatus as described herein may serve merely to slow the fall of a user, and/or to allow the user to descend at a controlled rate.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event will such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A fall-protection apparatus comprising:
   a drum with a safety line connected thereto and that is rotatable relative to a housing of the apparatus;
   a pawl-support plate that is axially co-mounted with the drum and is co-rotatable with the drum and is rotatable relative to the drum through an arc of partial rotation,
   at least one flexure-borne pawl that is attached to the pawl-support plate by way of a flexure arm,
   a ratchet with at least one tooth that is engagable by an engaging end of the at least one flexure-borne pawl, and,
   at least one buttress that is affixed to a sidewall of the rotatable drum, the sidewall of the drum being a separate item from the pawl-support plate;
   wherein the apparatus is configured so that when the pawl is in a disengaged position, no portion of the pawl is in contact with the buttress; and, wherein the apparatus is further configured so that as the pawl moves generally radially outward from a disengaged position to an engaged position and the engaging end of the pawl engages a tooth of the ratchet, the pawl and the buttress move relative to each other in a circumferential direction so that at least a portion of a trailing end of the pawl contacts the buttress so that the buttress bears at least a portion of a force that is applied to the pawl upon the engaging of the pawl with the tooth of the ratchet.

2. The apparatus of claim 1 wherein the apparatus is configured so that when the drum is not rotating, the at least one pawl is in a disengaged position; and, so that upon rotation of the drum above a predetermined threshold value of rotational velocity, the pawl is urged by centrifugal force to move bodily generally radially outward into an engaged position in which the engaging end of the flexure-borne pawl engages a tooth of the ratchet.

3. The apparatus of claim 1 wherein a trailing end of the pawl is attached to a leading end of the flexure arm and wherein a leading end of the pawl is the engaging end that is configured to engage the tooth of the ratchet.

4. The apparatus of claim 1 wherein a trailing end of the flexure arm is attached to a flexure arm anchor that protrudes axially from the pawl-support plate.

5. The apparatus of claim 1 wherein the at least one pawl comprises multiple circumferentially-spaced flexure-borne pawls, each pawl being attached to an end of a separate flexure arm that extends from a separate flexure arm anchor; and, wherein the device comprises multiple circumferentially-spaced buttresses, each buttress being positioned circumferentially rearward of at least a portion of a trailing end of a pawl.

6. The apparatus of claim 5 wherein each flexure arm anchor is an integral component of a single, integral pawl-support module that is affixed to the pawl-support plate and protrudes axially from the pawl-support plate.

7. The apparatus of claim 1 wherein when the pawl is engaged with the tooth of the ratchet and the trailing end of the pawl is in contact with the buttress, a force-transfer pathway is established by the ratchet tooth, the pawl and the buttress, that extends from the ratchet to the drum without passing through a bearing on which the pawl-support plate is mounted.

8. The apparatus of claim 1 wherein the at least one flexure-borne pawl and the flexure arm by which the pawl is attached to the pawl-support plate, are positioned axially inwardly from the pawl-support plate.

9. The apparatus of claim 1 wherein the apparatus is configured so that upon engaging of the engaging end of the pawl with a tooth of the ratchet, the drum is brought to a hard stop, and wherein the safety line that is attached to the drum includes an in-line shock-absorber.

10. The apparatus of claim 1 wherein the apparatus comprises a friction brake comprising a layer of friction material and a rotatable member with a contact surface that is in contact with a friction-braking surface of the layer of friction material, and wherein the apparatus is configured so that upon engaging of the engaging end of the pawl with a tooth of the ratchet, the drum continues to rotate relative to the pawl-support plate until brought to a halt by the friction brake.

11. The apparatus of claim 1 wherein the apparatus comprises a friction brake comprising a layer of friction material that is in contact with a surface of the ratchet, and wherein the apparatus is configured so that upon engaging of the engaging end of the pawl with a tooth of the ratchet, the ratchet begins to rotate and continues to rotate until brought to a halt by the friction brake.

12. The apparatus of claim 1 wherein the apparatus is a self-retracting lifeline in which the safety line comprises a proximal end that is connected to the rotatable drum and a distal end that is attachable to a harness of a human user of the apparatus or to an anchorage of a workplace, and in which the rotatable drum is biased toward rotating in a direction that will retract the safety line onto the drum.

13. A fall-protection apparatus comprising:
   a drum with a safety line connected thereto and that is rotatable relative to a housing of the apparatus;
   a pawl-support plate that is axially co-mounted with the drum and is co-rotatable with the drum and is rotatable relative to the drum through an arc of partial rotation,
   at least one flexure-borne pawl that is attached to the pawl-support plate by way of a flexure arm,
   a ratchet with at least one tooth that is engagable by an engaging end of the at least one flexure-borne pawl, and,
   at least one buttress that is affixed to a sidewall of the rotatable drum, the sidewall of the drum being a separate item from the pawl-support plate;
   wherein the drum comprises at least one camming bollard that is fixed to the drum and protrudes axially from the drum so as to extend through an elongate slot in the pawl-support plate so that a portion of the camming bollard resides within a space radially inward of the pawl and/or radially inward of a leading segment of the flexure arm to which the pawl is attached.

14. The apparatus of claim 13 wherein the apparatus is configured so that upon acceleration of the drum above a predetermined threshold value of acceleration, the pawl-support plate will rotate circumferentially rearwardly relative to the drum away from a home position through an arc of partial rotation, causing the pawl to move circumferentially rearwardly relative to the drum and to the camming bollard, so that a radially-inward contact surface of the pawl and/or of a leading segment of the flexure arm impinges on a camming surface of the camming bollard causing the pawl to be urged bodily generally radially outward into an engaged position in which the engaging end of the pawl engages a tooth of the ratchet.

15. The apparatus of claim 14 wherein when the pawl is in a disengaged position and the pawl-support plate is in a home position relative to the drum, a circumferential gap between the pawl and the buttress exhibits a maximum value; and, wherein the rotation of the pawl-support plate circumferentially rearwardly relative to the drum causes the circumferential gap between the pawl and the buttress to be reduced by a factor of at least 50%.

16. The apparatus of claim 13 wherein the elongate slot in the pawl-support plate through which the camming bollard extends, exhibits a long axis that is at least generally locally aligned with an orbital path of the pawl, and wherein an elongate length of the elongate slot in the pawl-support plate defines the arc of partial rotation through which the pawl-support plate is rotatable relative to the drum.

17. The apparatus of claim 13 wherein the apparatus is a self-retracting lifeline in which the safety line comprises a proximal end that is connected to the rotatable drum and a distal end that is attachable to a harness of a human user of the apparatus or to an anchorage of a workplace, and in which the rotatable drum is biased toward rotating in a direction that will retract the safety line onto the drum.

18. A fall-protection apparatus comprising:
  a drum with a safety line connected thereto and that is rotatable relative to a housing of the apparatus;
  a pawl-support plate that is axially co-mounted with the drum and is co-rotatable with the drum and is rotatable relative to the drum through an arc of partial rotation,
  at least one flexure-borne pawl that is attached to the pawl-support plate by way of a flexure arm,
  a ratchet with at least one tooth that is engagable by an engaging end of the at least one flexure-borne pawl, and,
  at least one buttress that is affixed to a sidewall of the rotatable drum, the sidewall of the drum being a separate item from the pawl-support plate;
    wherein the at least one flexure-borne pawl and the flexure arm by which the pawl is attached to the pawl-support plate, are positioned axially outwardly from the pawl-support plate, and wherein the at least one buttress that is affixed to the sidewall of the rotatable drum extends axially outwardly away from the drum a sufficient distance that at least a portion of the at least one buttress is positioned axially outward of the pawl-support plate.

19. The apparatus of claim 18 wherein the pawl-support plate resides in an axially-outwardly-open-ended receptacle in the sidewall of the rotatable drum, with a radially outer perimeter of the pawl-support plate being circumferentially bounded by portions of the sidewall of the rotatable drum.

20. The apparatus of claim 18 wherein the apparatus is a self-retracting lifeline in which the safety line comprises a proximal end that is connected to the rotatable drum and a distal end that is attachable to a harness of a human user of the apparatus or to an anchorage of a workplace, and in which the rotatable drum is biased toward rotating in a direction that will retract the safety line onto the drum.

\* \* \* \* \*